(12) United States Patent
Kim

(10) Patent No.: US 10,644,412 B2
(45) Date of Patent: May 5, 2020

(54) ANTENNA, ANTENNA MODULE, AND VEHICLE

(71) Applicant: HYUNDAI MOTOR COMPANY, Seoul (KR)

(72) Inventor: Dongjin Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 836 days.

(21) Appl. No.: 14/956,055

(22) Filed: Dec. 1, 2015

(65) Prior Publication Data

US 2017/0085011 A1 Mar. 23, 2017

(30) Foreign Application Priority Data

Sep. 21, 2015 (KR) .................. 10-2015-0132847

(51) Int. Cl.
| | |
|---|---|
| G01S 13/02 | (2006.01) |
| H01Q 1/38 | (2006.01) |
| H01Q 25/00 | (2006.01) |
| H01Q 13/18 | (2006.01) |
| H01Q 21/06 | (2006.01) |
| H01Q 3/24 | (2006.01) |
| H01Q 1/32 | (2006.01) |
| G01S 13/931 | (2020.01) |

(52) U.S. Cl.
CPC ......... *H01Q 25/002* (2013.01); *H01Q 1/3233* (2013.01); *H01Q 1/38* (2013.01); *H01Q 3/24* (2013.01); *H01Q 13/18* (2013.01); *H01Q 21/064* (2013.01); *G01S 2013/9316* (2020.01)

(58) Field of Classification Search
CPC ........................... H01Q 25/002; H01Q 1/3233

USPC ......................................................... 342/195
See application file for complete search history.

(56) References Cited

U.S. PATENT DOCUMENTS

| | | | | |
|---|---|---|---|---|
| 6,081,241 A | * | 6/2000 | Josefsson | ................ H01P 5/107 333/26 |
| 2004/0004576 A1 | * | 1/2004 | Anderson | ............ H01Q 13/106 343/770 |

FOREIGN PATENT DOCUMENTS

| | | |
|---|---|---|
| JP | 11-186834 A | 7/1999 |
| JP | 2007-110331 A | 4/2007 |
| KR | 20-0205563 Y1 | 12/2000 |
| KR | 10-2002-0070896 A | 9/2002 |
| KR | 10-2009-0016358 A | 2/2009 |
| KR | 10-1274250 B1 | 6/2013 |

OTHER PUBLICATIONS

Korean Office Action issued in Application No. 10-2015-0132847 dated May 25, 2016.

* cited by examiner

*Primary Examiner* — Peter M Bythrow
*Assistant Examiner* — Helena H Seraydaryan
(74) *Attorney, Agent, or Firm* — Morgan, Lewis & Bockius LLP

(57) ABSTRACT

An antenna includes first and second conductive plates disposed to face each other, a dielectric disposed between the first and second conductive plates, and a plurality of via holes which penetrate the first and second conductive plates and the dielectric. A first emission cavity and a plurality of second emission cavities which emit radio waves are formed by the plurality of via holes and the first and second conductive plates.

8 Claims, 19 Drawing Sheets

ANTENNA, ANTENNA MODULE, AND VEHICLE

CROSS-REFERENCE TO RELATED APPLICATION

This application claims the benefit of priority to Korean Patent Application No. 10-2015-0132847, filed on Sep. 21, 2015 in the Korean Intellectual Property Office, the disclosure of which is incorporated herein by reference.

BACKGROUND

1. Field

Embodiments of the present invention relate to an antenna, and more particularly, to an antenna which generates mutually different beam patterns, an antenna module, and a vehicle.

2. Description of the Related Art

Generally, vehicles are transportation apparatuses which drive on a road or railroad using fossil fuel, electricity, etc. as a power source.

Recently, aside from simply transporting goods and humans, vehicles generally include audio devices and video devices to allow drivers to listen to music and watch videos, and also generally include navigation devices which show driver's paths to their destinations.

These days, the need for communication between vehicles and external devices is gradually increasing. For example, a navigation function of indicating a path to a destination requires information related to road traffic conditions to find an optimal path. Since such traffic conditions constantly change, it is necessary for vehicles to obtain information on traffic conditions in real time.

Communication devices with external vehicles include an antenna for transmission and reception.

Also, during communication with an external vehicle, communication distance may vary according to traffic conditions. Accordingly, to communicate with external vehicles, an antenna capable of generating different beam patterns according to traffic conditions is necessary.

SUMMARY

Therefore, it is an aspect of the present invention to provide an antenna capable of generating two or more different beam patterns.

It is another aspect of the present invention to provide an antenna module capable of generating different beam patterns according to distance from a communication target.

It is still another aspect of the present invention to provide a vehicle capable of communicating with a communication target vehicle using different beam patterns according to distance from the communication target vehicle.

Additional aspects of the invention will be set forth in part in the description which follows and, in part, will be obvious from the description, or may be learned by practice of the invention.

In accordance with one aspect of the present invention, an antenna includes first and second conductive plates disposed to face each other, a dielectric disposed between the first and second conductive plates, and a plurality of via holes which penetrate the first and second conductive plates and the dielectric. A first emission cavity and a plurality of second emission cavities which emit radio waves are formed by the plurality of via holes and the first and second conductive plates. The first conductive plate includes a first feeder circuit which transmits a radio frequency (RF) signal. to the first emission cavity, and a first ground plate which forms the first emission cavity and the plurality of emission cavities. The second conductive plate includes a second feeder circuit which transmits an RF signal. to the plurality of second emission cavities and a second ground plate which forms the first emission cavity and the plurality of emission cavities.

The plurality of via holes may include a plurality of sidewall via holes arranged in a direction in which the radio waves are emitted and a plurality of leak prevention via holes which are provided adjacent to the first and second feeder circuits and prevent leaking of the radio waves.

Distances between the plurality of via holes may be shorter than 0.1 times a wavelength of the radio waves emitted through one of the first emission cavity and the plurality of emission cavities.

The first emission cavity may share the sidewall via holes with at least two of the plurality of second emission cavities.

The first feeder circuit may include a first feeder line which transmits the RF signal to the first emission cavity and a first emission hole which emits radio waves corresponding to the RF signal. to the first emission cavity.

The second feeder circuit may include a second feeder line which transmits the RF signal to the plurality of second emission cavities and a plurality of second emission holes which emit radio waves corresponding to the RF signal to the second emission cavities.

In the second feeder circuit, distances from one end of the second feeder line to the plurality of second emission holes may be identical.

When the RF signal is supplied through the first feeder circuit, the first emission cavity may emit radio waves corresponding to the RF signal. When the RF signal is supplied through the second feeder circuit, the plurality of second emission cavities may emit radio waves corresponding to the RF signal.

The radio waves emitted by the first emission cavity may form a first beam pattern, and the radio waves emitted by the plurality of second emission cavities may form a second beam pattern.

In accordance with another aspect of the present invention, an antenna module includes an antenna structure in which first and second antennas which emit radio waves into free air space are provided, an antenna selection switch which activates one of the first and second antennas, and an antenna selection controller which provides an antenna selection signal for activating one of the first and second antennas depending on the strength of a reception signal received through one of the first and second antennas to the antenna selection switch.

The first antenna may emit radio waves having a first beam pattern, and the second antenna may emit radio waves having a second beam pattern.

When the strength of the reception signal is below a predetermined first reference strength while the first antenna is activated, the antenna selection controller may activate the second antenna.

When the strength of the reception signal is below a predetermined second reference strength while the second antenna is activated, the antenna selection controller may activate the first antenna.

The antenna structure may include first and second conductive plates disposed to face each other, a dielectric disposed between the first and second conductive plates, and a plurality of via holes which penetrate the first and second conductive plates and the dielectric. A first emission cavity and a plurality of second emission cavities which emit radio waves may be formed by the plurality of via holes and the first and second conductive plates.

The first conductive plate may include a first feeder circuit which transmits an RF signal to the first emission cavity and a first ground plate which forms the first emission cavity and the plurality of emission cavities, and the second conductive plate may include a second feeder circuit which transmits an RF signal to the plurality of second emission cavities and a second ground plate which forms the first emission cavity and the plurality of emission cavities.

When the first antenna is activated, the first emission cavity may emit radio waves. When the second antenna is activated, the plurality of second emission cavities may emit radio waves.

In accordance with still another aspect of the present invention, a vehicle includes a transmission data processor which outputs a transmission signal with a low frequency (LF) corresponding to transmission data, a transmitter which modulates the LF transmission signal into an RF transmission signal, an antenna module which emits the RF transmission signal into free air space or receives an RF reception signal from free air space, a receiver which demodulates the RF reception signal into a LF reception signal, and a reception data processor which outputs reception data corresponding to the LF reception signal. The antenna module includes first and second antennas which emit radio waves into free air space and an antenna selection controller which activates one of the first and second antennas depending on the strength of the RF reception signal.

The first antenna may emit radio waves having a first beam pattern, and the second antenna may emit radio waves having a second beam pattern.

When the strength of the RF reception signal is below a predetermined first reference strength while the first antenna is activated, the antenna selection controller may activate the second antenna.

When the strength of the RF reception signal is below a predetermined second reference strength while the second antenna is activated, the antenna selection controller may activate the first antenna.

In accordance with yet another aspect of the present invention, a method of controlling a vehicle which includes first and second antennas that emit radio waves having mutually different beam patterns includes activating one of the first and second antennas and activating another of the first and second antennas depending on the strength of a reception signal received by the one antenna. The first antenna emits radio waves having a first beam pattern, and the second antenna emits radio waves having a second beam pattern.

The activating of the other of the first and second antennas may include activating the second antenna when the strength of the reception signal is less than a predetermined first reference strength while the first antenna is activated.

The activating of the other of the first and second antennas may include activating the first antenna when the strength of the reception signal is less than a predetermined second reference strength while the second antenna is activated.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
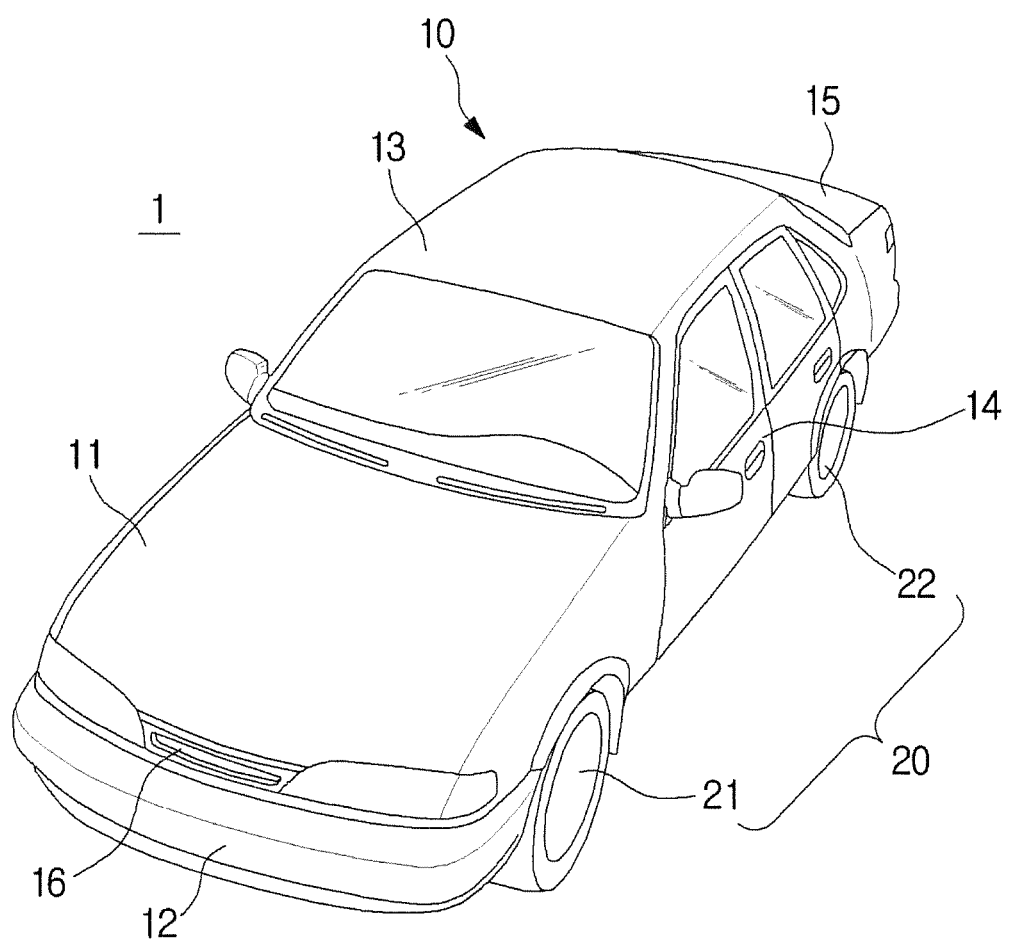
FIG. 1 illustrates a body of a vehicle in accordance with one embodiment of the present invention.

Reference will now be made in detail to embodiments of the present invention, examples of which are illustrated in the accompanying drawings, wherein like reference numerals refer to like elements throughout.

Embodiments described herein and configurations shown in the drawings are merely exemplary examples. Also, various modified examples with which these embodiments and the drawings could be replaced may be present at the point in time of the filing of the present application.

Hereinafter, one embodiment of the present invention will be described in detail with reference to the attached drawings.

Figure 2:
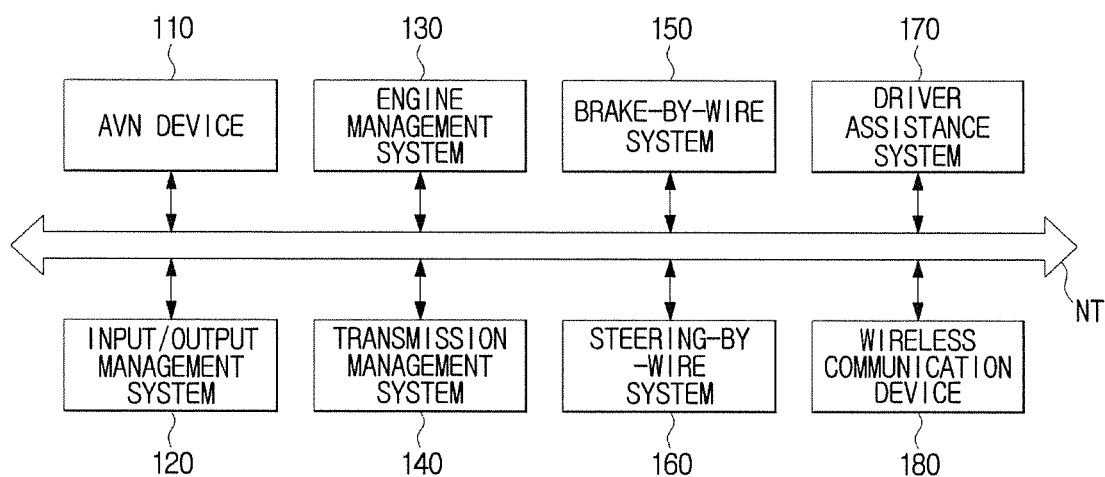
FIG. 2 illustrates electronic devices included in the vehicle in accordance with one embodiment of the present invention.
Figure 3:
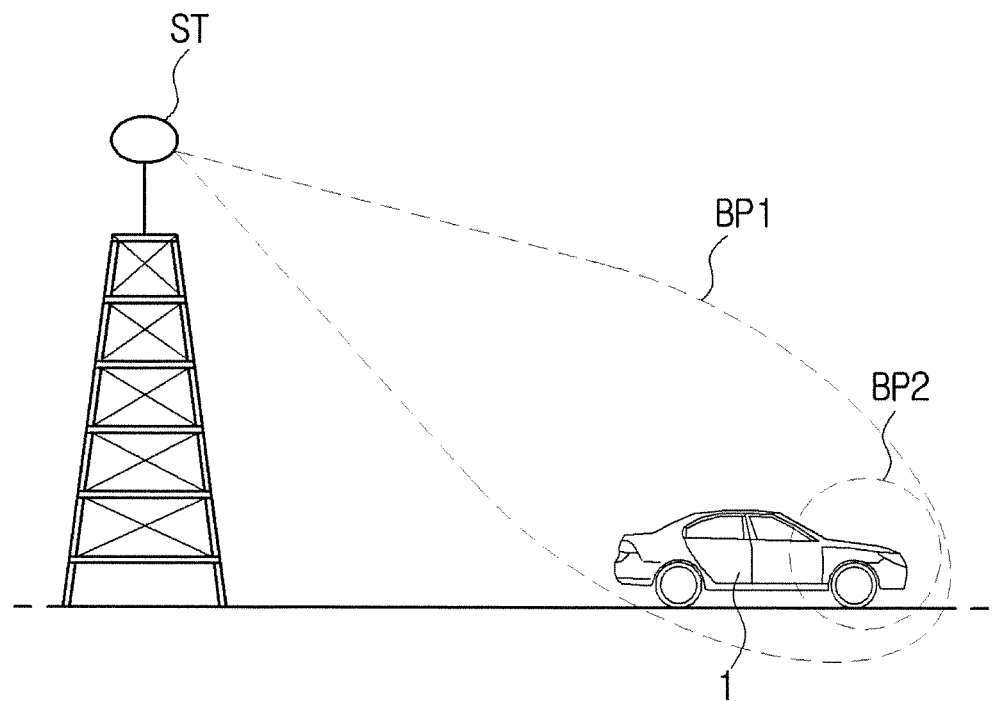
FIGS. 3 and 4 illustrate examples of communication performed by a wireless communication device included in the vehicle in accordance with one embodiment of the present invention.
Figure 4:
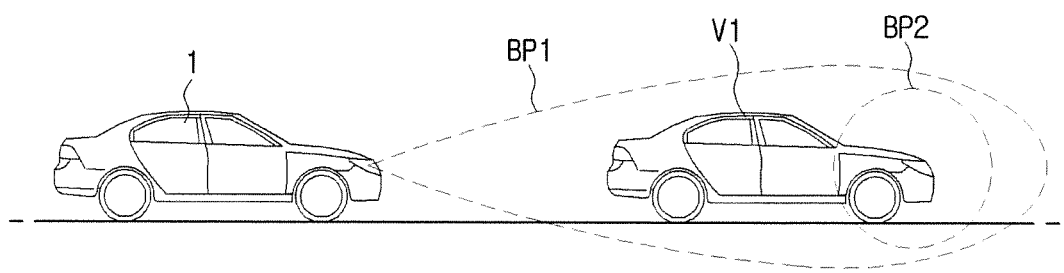

FIG. 1 illustrates a body 10 of a vehicle 1 in accordance with one embodiment of the present invention. FIG. 2 illustrates electronic devices 100 included in the vehicle 1 in accordance with one embodiment of the present invention. FIGS. 3 and 4 illustrate examples of communication performed by a wireless communication device included in the vehicle 1 in accordance with one embodiment of the present invention.

The vehicle 1 may include the body 10 which forms an exterior, wheels 20 which move the vehicle 1, a power system (not shown) which generates torque for rotating the wheels 20, a power train system (not shown) which transfers the torque generated by the power system to the wheels 20 while changing a speed, a steering system (not shown) which controls movement direction of the vehicle 1, a brake system (not shown) which stops rotation of the wheels 20, a suspension system (not shown) which reduces vibrations of the vehicle 1, and the electronic device 100 which electrically controls respective components included in the vehicle 1.

The body 10 may include a hood 11, a front bumper 12, a roof panel 13, doors 14, a trunk lid 15, a radiator grille 16, etc.

The power system may include an engine, a fuel system, a cooling system, an exhaust, an ignition, etc. The power train system may include a clutch, a transmission, a differential gear, a driving shaft, etc. The steering system may include a steering wheel, a steering gear, a steering link, etc. The brake system may include a brake disk, a brake pad, a master cylinder, etc. The suspension system may include a shock absorber, etc.

The vehicle 1 may include various electronic devices 100 together with the mechanical devices described above.

As shown in FIG. 2, the vehicle 1 may include an audio/video/navigation (AVN) device 110, an input/output control system 120, an engine management system (EMS) 130, a transmission management system (TMS) 140, a brake-by-wire system 150, a steering-by-wire system 160, a driver assistance system (DAS) 170, a wireless communication device 180, etc.

The electronic devices 100 shown in FIG. 2 may be only some of various electronic devices provided in the vehicle 1. In addition, the vehicle 1 may not always include all the electronic devices 100 shown in FIG. 2, and some electronic devices may be omitted for brevity.

All types of the electronic devices 100 included in the vehicle 1 may communicate with one another through a vehicle communication network NT. The vehicle communication network NT may employ communication protocols such as a media oriented systems transport (MOST) which has a maximum communication speed of 24.5 megabits per second (Mbps), a FlexRay which has a maximum communication speed of 10 Mbps, a controller area network (CAN) which has a communication speed of from about 125 kilobits per second (kbps) to about 1 Mbps, and a local interconnect network (LIN) which has a communication speed of about 20 kbps, etc. The vehicle communication network NT described above may employ not only a single communication protocol such as MOST, FlexRay, CAN, LIN, etc. but also a plurality of communication protocols.

The AVN device 110 is a device which outputs music or videos according to a control command of a driver. In detail, the AVN device 110 may play music or videos or may indicate a path to a destination according to the control command of the driver.

The input/output control system 120 receives the control command of the driver through a button and displays information corresponding to the control command of the driver. The input/output control system 120 may include a cluster display which is provided in a dash board and displays a vehicle speed, an engine speed, a lubrication amount, etc. and a wheel button module installed on the steering wheel.

The engine control system 130 performs fuel injection control, gas mileage feedback control, lean-burn control, ignition timing control, idle revolutions per minute (rpm) control, etc. The engine control system 130 may be not only a single device but also a plurality of devices connected through communication.

The transmission management system 140 performs shifting point management, damper clutch management, management of pressure when a frictional clutch is turned on or off, engine torque management when a speed is changed, etc. The transmission management system 140 may be not only a single device but also a plurality of devices connected through communication.

The brake-by-wire system 150 may manage a brake of the vehicle 1, and representatively, may include an anti-lock brake system (ABS), etc.

The steering-by-wire system 160 reduces a steering force during low-speed driving or in a parked state and increases the steering force during high-speed driving, thereby helping the driver with a steering operation.

The driver assistance system 170 may assist with driving of the vehicle 1 and may perform functions such as a forward collision avoidance, lane departure warning, blind spot monitoring, rear sensing, etc.

The driver assistance system 170 may include a plurality of devices connected through communication. For example, the driver assistance system 170 may include a forward collision warning system (FCWS), an advanced emergency braking system (AEBS), an adaptive cruise control (ACC) system, a lane departure warning system (LDWS), a lane keeping assist system (LKAS), a blind spot detection (BSD) system, a rear-end collision warning system (ROWS), etc.

The wireless communication device 180 may communicate with another vehicle, an external terminal, or a base station.

The wireless communication device 180 may transmit and receive signals through various communication protocols. For example, the wireless communication device 180 may employ second generation (2G) communication such as time division multiple access (TDMA), code division multiple access (CDMA), etc., third generation (3G) communication such as wide code division multiple access (WCDMA), code division multiple access 2000 (CDMA2000), Wireless Broadband (WiBro), Worldwide Interoperability for Microwave Access (WiMAX), etc., and fourth generation (4G) communication such as Long Term Evolution (LTE), WiBro Evolution, etc. In addition, the wireless communication device 180 may employ fifth generation (5G) communication.

Here, the wireless communication device 180 not only may transmit and receive wireless signals in all directions but may also transmit and receive wireless signals to or from a particular area or in a particular direction using beamforming.

When using beamforming, the wireless communication device 180 may transmit and receive wireless signals in a millimeter wave band through beamforming. Here, the millimeter wave band indicates a band from about 30 GHz to about 300 GHz, but the present invention is not limited to the millimeter wave band.

When a wireless signal in the millimeter wave band is focused in a particular direction, a beam pattern having a particular shape shown by the strength of the wireless signal is formed. As described above, forming the beam pattern by focusing the wireless signal is referred to as beamforming. Also, beamforming may be performed by a phased array antenna.

For example, as shown in FIG. 3, the vehicle 1 may transmit and receive wireless data with a base station ST using beamforming. The base station ST may form a first beam pattern BP1 and the vehicle 1 may form a second beam pattern BP2.

As another example, as shown in FIG. 4, the vehicle 1 may transmit and receive wireless data with another vehicle V1 using beamforming. The vehicle 1 may form the first beam pattern BP1 and the other vehicle V1 may form the second beam pattern BP2.

As shown in FIGS. 3 and 4, the shape of a beam pattern BP formed by the vehicle 1 may vary. In other words, the vehicle 1 may generate different beam patterns BP depending on whether a communication target is the base station ST or the other vehicle V1. Also, the vehicle 1 may generate the beam pattern BP differently according to distance to the communication target.

Hereinafter, a configuration of the wireless communication device 180 and an antenna included in the wireless communication device 180 will be described.

Figure 5:
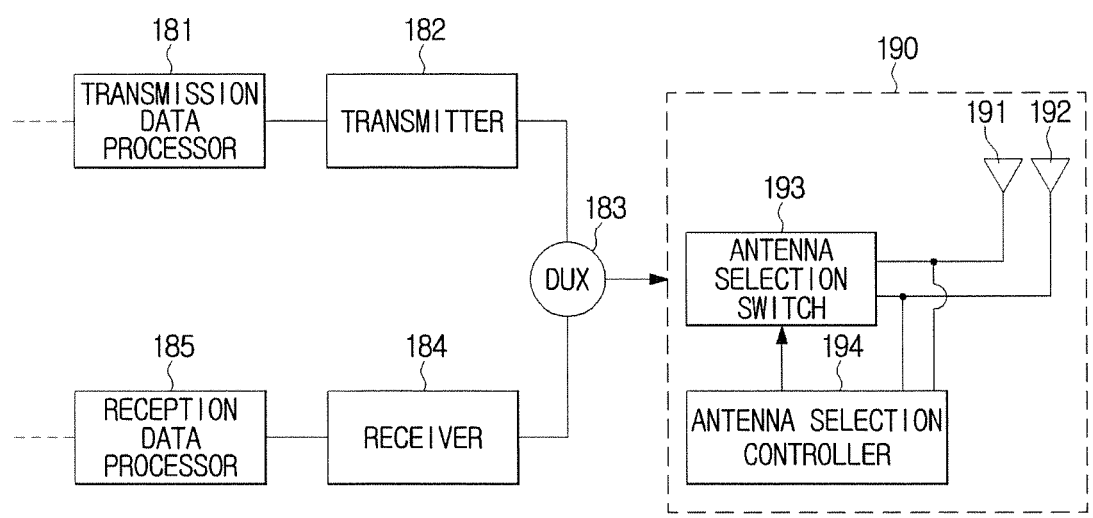
FIG. 5 is a configuration diagram of the wireless communication device included in the vehicle in accordance with one embodiment of the present invention.

FIG. 5 is a configuration diagram of the wireless communication device 180 included in the vehicle 1 in accordance with one embodiment of the present invention.

The wireless communication device 180, as shown in FIG. 5, includes a transmission data processor 181, a transmitter 182, a duplexer 183, a receiver 184, a reception data processor 185, and an antenna module 190.

The transmission data processor 181 converts digital transmission data received from another electronic device into a LF transmission signal and provides the LF transmission signal to the transmitter 182.

The transmitter 182 modulates the LF transmission signal using an RF signal of a local oscillator and outputs the modulated RF transmission signal.

The duplexer 183 provides the RF transmission signal received from the transmitter 182 to the antenna module 190 or provides a reception signal with an RF received from the antenna module 190 to the receiver 184.

The receiver 184 demodulates the RF reception signal received from the duplexer 183 using the RF signal of the local oscillator and outputs the demodulated LF reception signal.

The reception data processor 185 converts the LF reception signal received from the receiver 184 into digital reception data and outputs the converted digital reception data.

The transmission data processor 181 and the reception data processor 185 may be implemented as one digital processor. The transmitter 182, the duplexer 183, and the receiver 184 may be implemented as one analog processor. However, they are not limited thereto and the transmission data processor 181, the transmitter 182, the duplexer 183, the receiver 184, and the reception data processor 185 may be implemented as one processor.

The antenna module 190 emits the RF transmission signal received from the duplexer 183 into free air space and provides an RF reception signal received from free air space to the duplexer 183.

The antenna module 190 described above may include a first antenna 191, a second antenna 192, an antenna selection switch 193, and an antenna selection controller 194.

The first antenna 191 and the second antenna 192 may transmit and receive wireless signals through free air space.

The first antenna 191 and the second antenna 192 may generate beam patterns having mutually different shapes. For example, the first antenna 191 may generate a beam pattern with a large width by emitting wireless signals at a wide emission angle, and the second antenna 192 may generate a beam pattern with a small width and a long length by emitting wireless signals at a narrow emission angle.

Also, the first antenna 191 and the second antenna 192 may be implemented as one antenna structure.

The antenna selection switch 193 may select one of the first antenna 191 and the second antenna 192 according to an antenna selection signal of the antenna selection controller 194, and may provide an RF transmission signal or receive an RF reception signal to or from a selected antenna. The antenna selection switch 193 described above may include at least one high frequency (HF) transistor.

The antenna selection controller 194 may select one of the first antenna 191 and the second antenna 192 according to the strength of reception signals received through the first antenna 191 and the second antenna 192, and may provide an antenna selection signal corresponding to the selected one of the first and second antennas 191 and 192 to the antenna selection switch 193.

The antenna selection controller 194 may be implemented by an additional processor or may be implemented as the one processor integrated with the transmission data processor 181, the transmitter 182, the duplexer 183, the receiver 184, and the reception data processor 185 described above.

As described above, the wireless communication device 180 may transmit an RF transmission signal to an external device through the antenna module 190 and may receive an RF reception signal transmitted from the external device through the antenna module 190.

Hereinafter, an antenna structure which implements the first and second antennas 191 and 192 will be described.

Figure 6:
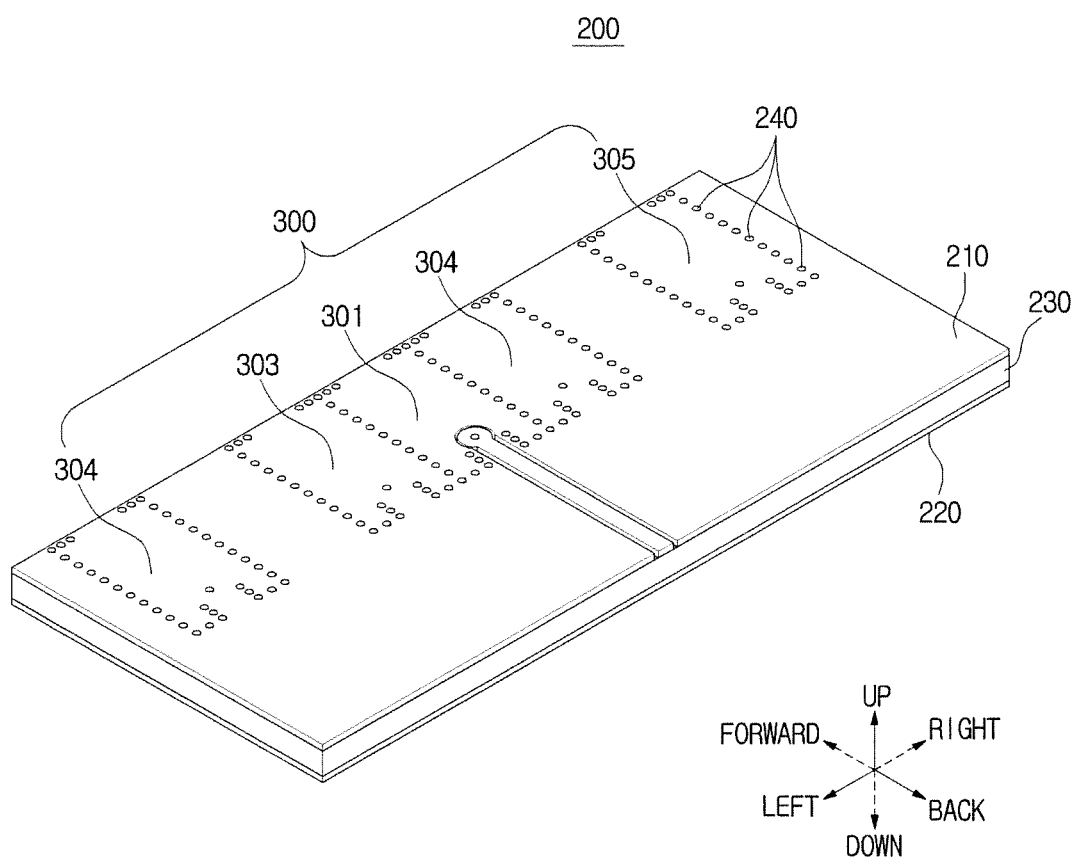
FIG. 6 illustrates an exterior of an antenna structure in accordance with one embodiment of the present invention.
Figure 7:
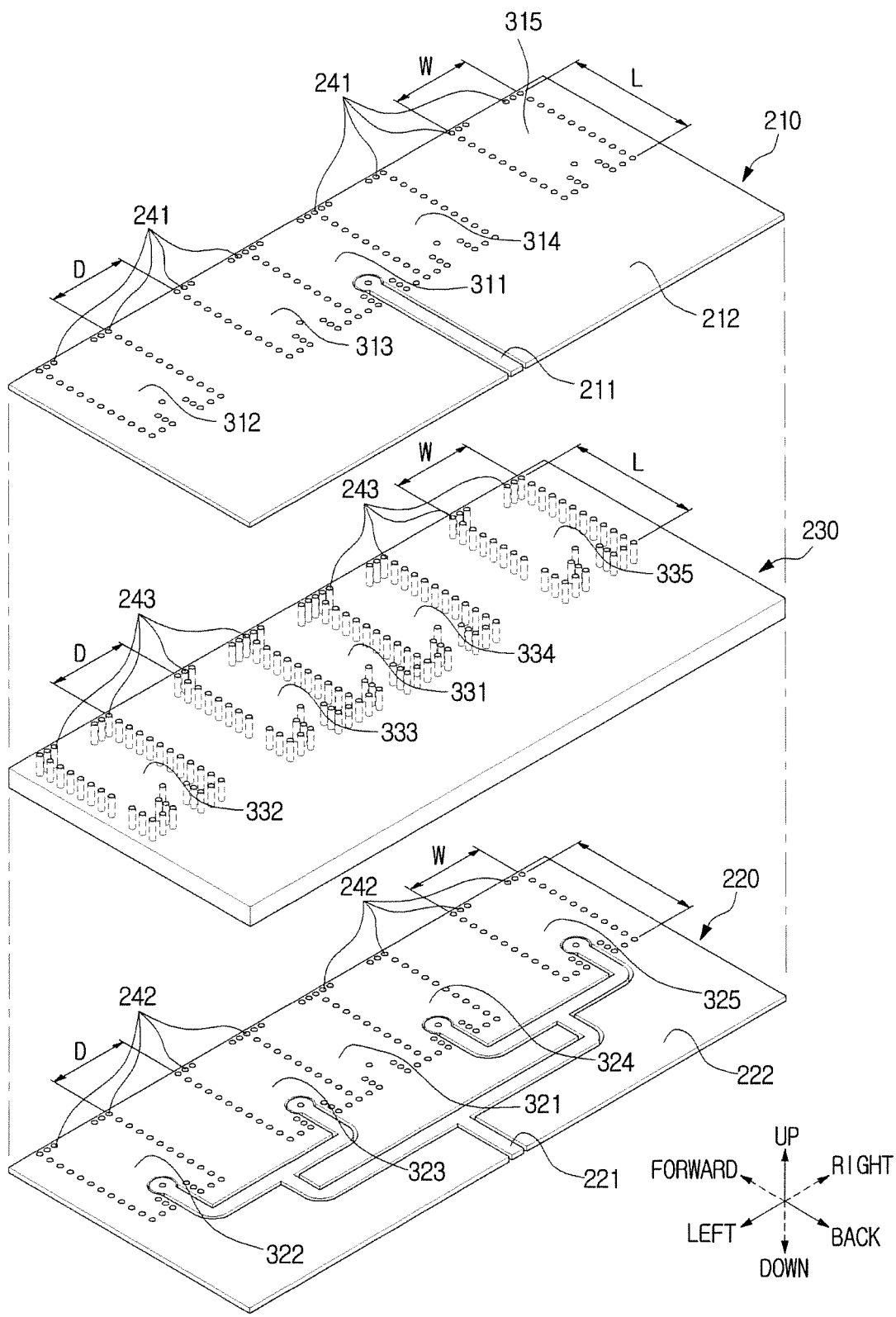
FIG. 7 is an exploded perspective view of the antenna structure in accordance with one embodiment of the present invention.
Figure 8:
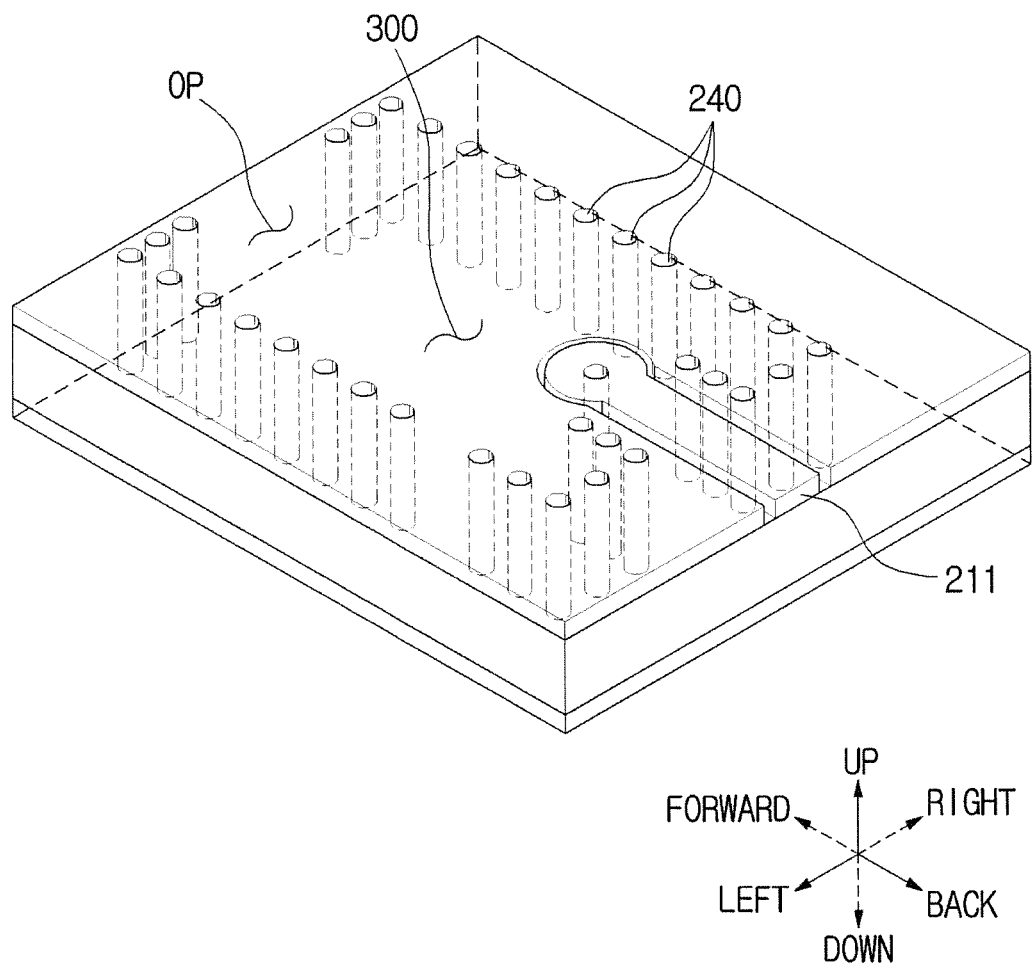
FIG. 8 is an enlarged view illustrating area A shown in FIG. 6.
Figure 9:
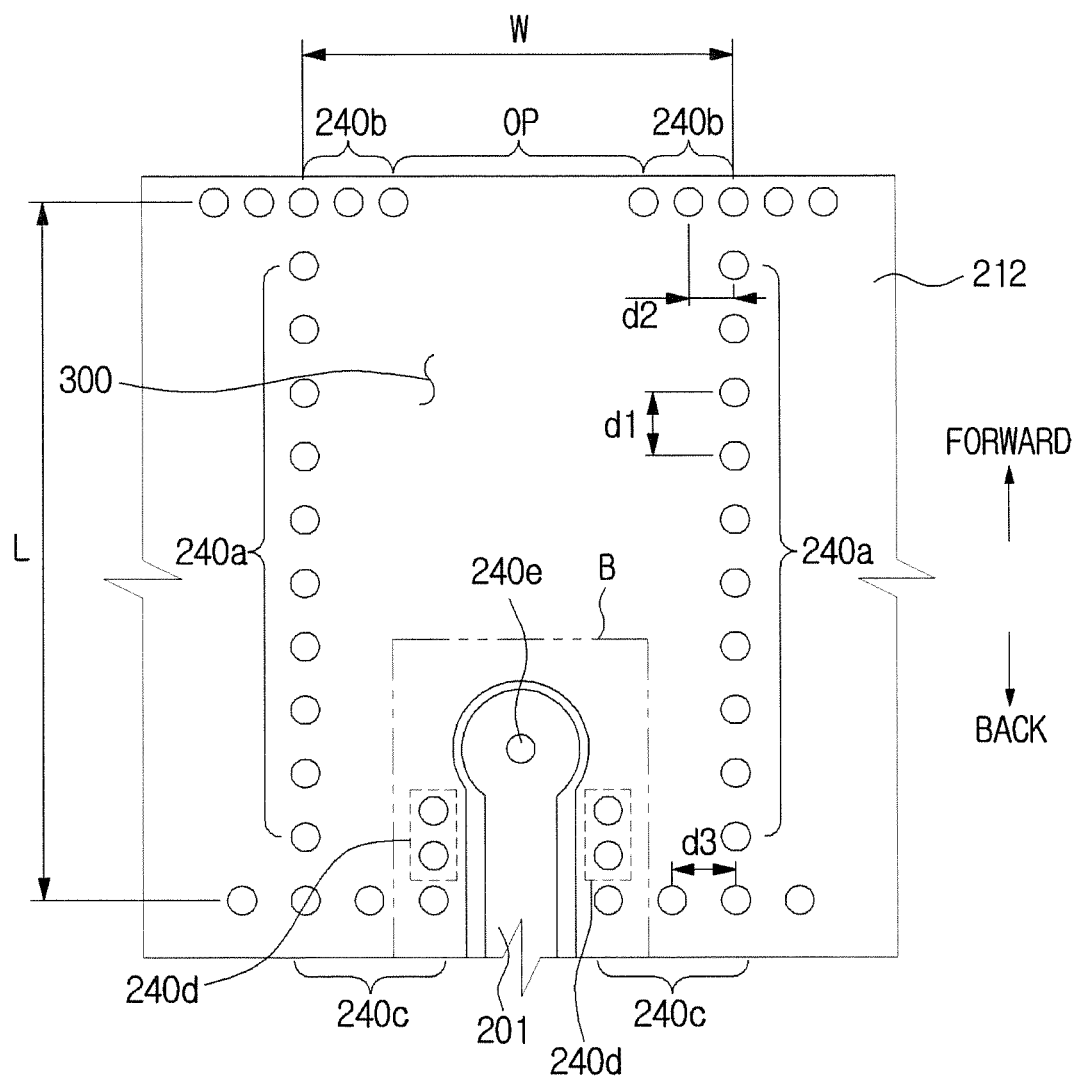
FIG. 9 is a top view illustrating area A shown in FIG. 8.
Figure 10:
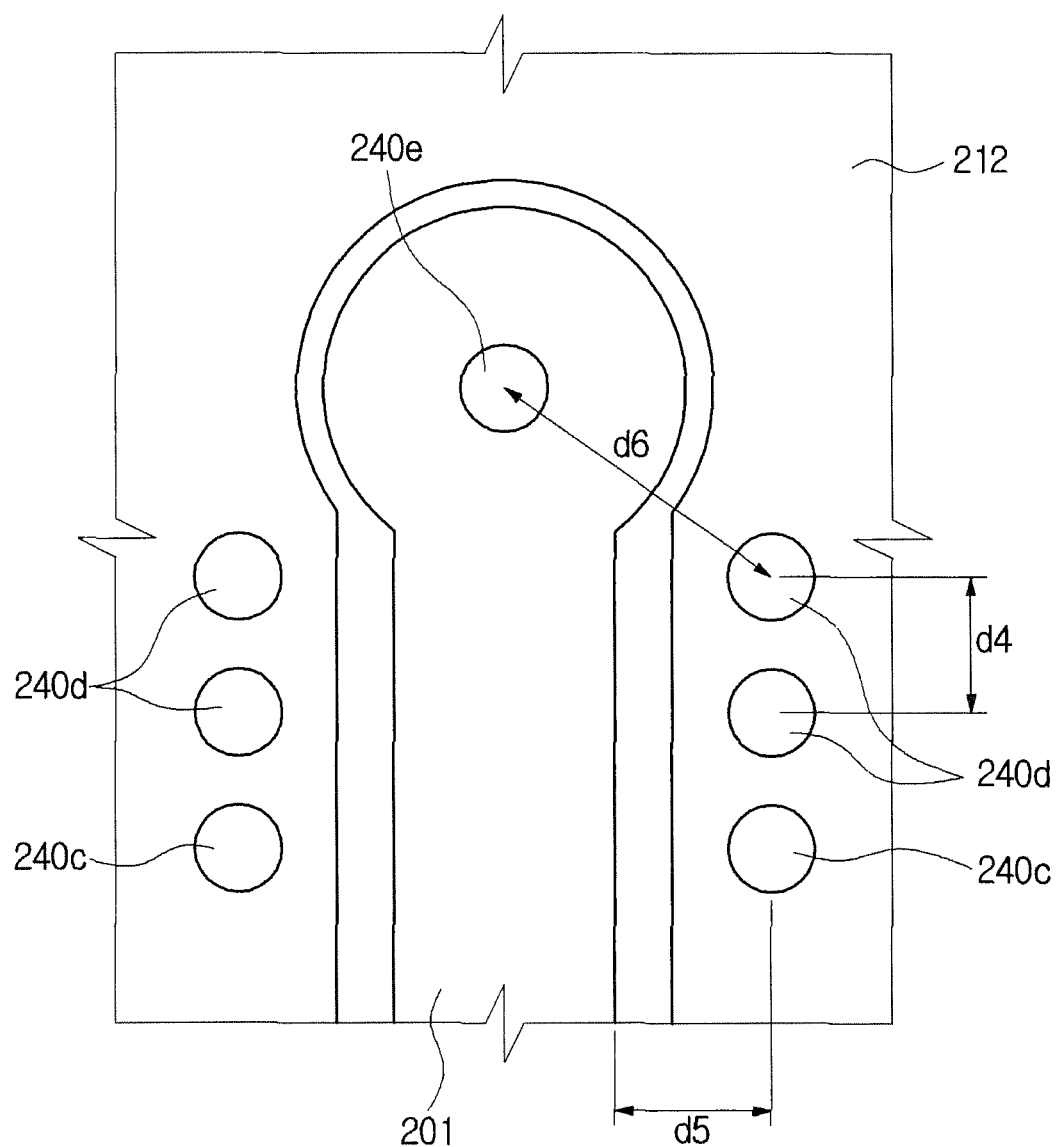
FIG. 10 is an enlarged view illustrating area B shown in FIG. 9.

FIG. 6 illustrates an exterior of an antenna structure 200 in accordance with one embodiment of the present invention. FIG. 7 is an exploded perspective view of the antenna structure 200 in accordance with one embodiment of the present invention. FIG. 8 is an enlarged view illustrating area A shown in FIG. 6. FIG. 9 is a top view illustrating area A shown in FIG. 8. FIG. 10 is an enlarged view illustrating area B shown in FIG. 9.

As shown in FIG. 6, the antenna structure 200 may include an upper conductive plate 210, a lower conductive plate 220, and a dielectric 230. Also, in the antenna structure 200, a plurality of via holes 240 which penetrate the upper conductive plate 210, the lower conductive plate 220, and the dielectric 230 are formed.

As shown in FIG. 7, the upper conductive plate 210 and the lower conductive plate 220 are disposed to face each other and the dielectric 230 is provided between the upper conductive plate 210 and the lower conductive plate 220.

On the upper conductive plate 210, an upper feeder circuit 211 and an upper ground plate 212 are formed.

The upper feeder circuit 211 and the upper ground plate 212 are insulated from each other. In detail, a groove which extends from a top surface to a bottom surface of the upper conductive plate 210 is formed between the upper feeder circuit 211 and the upper ground plate 212. The groove which insulates the upper feeder circuit 211 and the upper ground plate 212 from each other may be formed by selectively etching the upper conductive plate 210.

The upper feeder circuit 211 may receive an RF transmission signal or may provide an RF reception signal from or to the antenna selection switch 193 (refer to FIG. 5).

The upper ground plate 212 is electrically grounded. Also, a plurality of upper plate holes 241 are formed in the upper ground plate 212. The plurality of upper plate holes 241 form the via holes 240.

The plurality of upper plate holes 241 are disposed in a rectangular shape. In detail, when spaces amid the adjacent upper plate holes 241 are connected, a rectangular shape is formed by a line connecting the spaces amid the plurality of upper plate holes 241.

Also, the upper ground plate 212 is partitioned into a plurality of areas 311, 312, 313, 314, and 315 by the plurality of upper plate holes 241. The upper ground plate 212 may be partitioned into a first upper ground area 311, a second upper ground area 312, a third upper ground area 313, a fourth upper ground area 314, and a fifth upper ground area 315 by the plurality of upper plate holes 241. Here, the first upper ground area 311, the second upper ground area 312, the third upper ground area 313, the fourth upper ground area 314, and the fifth upper ground area 315 may have the same widths W and lengths L.

Also, the first upper ground area 311, the third upper ground area 313, and the fourth upper ground area 314 located in a center of the upper ground plate 212 are formed adjacent to one another. A left side of the first upper ground area 311 and a right side of the third upper ground area 313 share the same upper plate holes 241 and a right side of the first upper ground area 311 and a left side of the fourth upper ground area 314 share the same upper plate holes 241.

The second upper ground area 312 and the fifth upper ground area 315 may be formed separately from the first upper ground area 311, the third upper ground area 313, and the fourth upper ground area 314. The distance between the second upper ground area 312 and the third upper ground area 313 may be identical to the widths W of the first, second, third, fourth, and fifth upper ground areas 311, 312, 313, 314, and 315. The distance between the fourth upper ground area 314 and the fifth upper ground area 315 may be identical to the widths W of the first, second, third, fourth, and fifth upper ground areas 311, 312, 313, 314, and 315.

Also, the upper feeder circuit 211 extends into the first upper ground area 311. In other words, the upper feeder circuit 211 is provided in the first upper ground area 311.

On the lower conductive plate 220, a lower feeder circuit 221 and a lower ground plate 222 are formed.

The lower feeder circuit 221 and the lower ground plate 222 are insulated from each other. A groove which extends from a top surface to a bottom surface of the lower conductive plate 220 is formed between the lower feeder circuit 221 and the lower ground plate 222. The groove which insulates the lower feeder circuit 221 and the lower ground plate 222 from each other may be formed by selectively etching the lower conductive plate 220.

The lower feeder circuit 221 may receive an RF transmission signal or may provide an RF reception signal from or to the antenna selection switch 193 (refer to FIG. 5).

The lower ground plate 222 is electrically grounded. A plurality of lower plate holes 242 are formed in the lower ground plate 222. The plurality of lower plate holes 242 are provided in positions corresponding to the plurality of upper plate holes 241 and form the via holes 240 together with the plurality of upper plate holes 241.

The lower ground plate 222 may be electrically connected to the upper ground plate 212 through the via holes 240.

The plurality of lower plate holes 242 are disposed in a rectangular shape. When spaces amid the adjacent lower plate holes 242 are connected, a rectangular shape is formed by a line connecting the spaces amid the plurality of lower plate holes 242.

The lower ground plate 222 is partitioned into a plurality of areas 321, 322, 323, 324, and 325 by the plurality of lower plate holes 242. The lower ground plate 222 may be partitioned into a first lower ground area 321, a second lower ground area 322, a third lower ground area 323, a fourth lower ground area 324, and a fifth lower ground area 325 by the plurality of lower plate holes 242. The first lower ground area 321, the second lower ground area 322, the third lower ground area 323, the fourth lower ground area 324, and the fifth lower ground area 325 may have the same widths W and lengths L.

The first lower ground area 321, the third lower ground area 323, and the fourth lower ground area 324 located in a center of the lower ground plate 222 are formed adjacent to one another. The left side of the first lower ground area 321 and right side of the third lower ground area 323 share the same lower plate holes 242, and the right side of the first lower ground area 321 and left side of the fourth lower ground area 324 share the same lower plate holes 242.

The second lower ground area 322 and the fifth lower ground area 325 may be formed separately from the first lower ground area 321, the third lower ground area 323, and the fourth lower ground area 324. The distance between the second lower ground area 322 and the third lower ground area 323 may be identical to the widths W of the first, second, third, fourth, and fifth lower ground areas 321, 322, 323, 324, and 325. The distance between the fourth lower ground area 324 and the fifth lower ground area 325 may be identical to the widths W of the first, second, third, fourth, and fifth lower ground areas 321, 322, 323, 324, and 325.

The lower feeder circuit 221 extends into the lower ground area 322, the third lower ground area 323, the fourth lower ground area 324, and the fifth lower ground area 325. In other words, the lower feeder circuit 221 is provided in the lower ground area 322, the third lower ground area 323, the fourth lower ground area 324, and the fifth lower ground area 325.

As described above, the dielectric 230 is provided between the upper conductive plate 210 and the lower conductive plate 220.

The dielectric 230 is formed of an insulating material which is polarized in an electric field but is not charged with electricity. The dielectric 230 may consist of various dielectric materials or air.

Since the dielectric 230 is polarized in the electric field, radio waves emitted by the first and second feeder circuits 211 and 212 may be transmitted through the dielectric 230 or may resonate in the dielectric 230.

Since the dielectric 230 is formed of an insulating material which is not charged with electricity, the upper conductive plate 210 and the lower conductive plate 220 are insulated by the dielectric 230. However, the upper ground plate 212 of the upper conductive plate 210 and the lower ground plate 222 of the lower conductive plate 220 may be electrically connected by the plurality of via holes 240.

As shown in FIG. 7, a plurality of dielectric holes 243 are formed in the dielectric 230. The plurality of dielectric holes 243 are provided in positions corresponding to the plurality of upper plate holes 241 and the plurality of lower plate holes 242 and form the via holes 240 together with the plurality of upper plate holes 241 and the plurality of lower plate holes 242.

The plurality of dielectric holes 243 are arranged in a rectangular shape in the dielectric 230. When spaces amid the adjacent dielectric holes 243 are connected, a rectangular shape may be formed by a line connecting the spaces amid the plurality of dielectric holes 243.

The dielectric 230 is partitioned into a plurality of areas 331, 332, 333, 334, and 335 by the plurality of dielectric holes 243. The dielectric 230 may be partitioned into a first dielectric area 331, a second dielectric area 332, a third dielectric area 333, a fourth dielectric area 334, and a fifth dielectric area 335 by the plurality of dielectric holes 243. The first dielectric area 331, the second dielectric area 332, the third dielectric area 333, the fourth dielectric area 334, and the fifth dielectric area 335 may have the same widths W and lengths L.

The first dielectric area 331, the third dielectric area 333, and the fourth dielectric area 334 located in a center of the dielectric 230 are formed adjacent to one another The left side of the first dielectric area 331 and right side of the third dielectric area 332 share the same dielectric holes 243, and the right side of the first dielectric area 331 and left side of the fourth dielectric area 334 share the same dielectric holes 243.

The second dielectric area 332 and the fifth dielectric area 335 may be separately formed from the first dielectric area 331, the third dielectric area 333, and the fourth dielectric area 334. The distance between the second dielectric area 332 and the third dielectric area 333 may be identical to the widths W of the first, second, third, fourth, and fifth dielectric areas 331, 332, 333, 334, and 335. The distance between the fourth dielectric area 334 and the fifth dielectric area 333 may be identical to the widths W of the first, second, third, fourth, and fifth dielectric areas 331, 332, 333, 334, and 335.

The via holes 240 are formed to penetrate the upper conductive plate 210, the lower conductive plate 220, and the dielectric 230. The via holes 240 may include the upper plate holes 241 formed in the upper conductive plate 210, the lower plate holes 242 formed in the lower conductive plate 220, and the dielectric holes 243 formed in the dielectric 230.

The via holes 240 may be filled with an electroconductive material such as a metal or the electroconductive material may be applied to the insides of the via holes 240. As a result, the upper conductive plate 210 and the lower conductive plate 220 may be electrically connected by the via holes 240. The upper ground plate 212 of the upper conductive plate 210 and the lower ground plate 222 of the lower conductive plate 220 are electrically connected by the via holes 240 and have the same electric potentials.

As described above, the via holes 240 are arranged in a rectangular shape. When spaces amid the adjacent via holes 240 are connected, a rectangular shape may be formed by a line connecting the spaces amid the plurality of via holes 240.

As a result, as shown in FIG. 8, a plurality of emission cavities 300 may be formed by the plurality of via holes 240, the upper conductive plate 210, and the lower conductive plate 220.

The upper conductive plate 210 is provided above the emission cavities 300 and the lower conductive plate 220 is provided below the emission cavities 300. The plurality of via holes 240 are provided on the side of the emission cavity 300.

As described above, the emission cavity 300 with a rectangular waveguide shape may be formed by the plurality of via holes 240, the upper conductive plate 210, and the lower conductive plate 220.

A feeder circuit 201 which outputs a signal to the emission cavity 300 may be provided on one rear side of the emission cavity 300, and an opening OP for emitting radio waves may be provided in front of the emission cavity 300.

As described above, since the side of the emission cavity 300 is formed of the plurality of via holes 240, it is necessary to arrange the via holes 240 to prevent leaking of radio waves between the plurality of via holes 240.

Hereinafter, an arrangement of the via holes 240 will be described.

The via holes 240 may include sidewall via holes 240a, front via holes 240b, rear via holes 240c, and leak prevention via holes 240d.

As shown in FIG. 9, a plurality of such sidewall via holes 240a are arranged along a front and rear of the antenna structure 200. In other words, the plurality of sidewall via holes 240a are arranged in a direction in which radio waves are emitted through the antenna structure 200.

To allow the radio waves to resonate in the emission cavity 300, a length L of the emission cavity 300 formed by the sidewall via holes 240a may be approximately identical to or may be an integer number times a wavelength of the radio waves to be emitted by the antenna structure 200.

For example, when the radio waves to be emitted through the antenna structure 200 are radio waves of 55 gigahertz (GHz), the length L of the emission cavity 300 may be about 5.5 millimeter (mm).

To allow the radio waves to resonate in the emission cavity 300, a width W of the emission cavity 300 formed by the sidewall via holes 240a may be about half the wavelength of the radio waves to be emitted by the antenna structure 200 or slightly more.

For example, when the radio waves to be emitted through the antenna structure 200 are radio waves of 55 GHz, the width W of the emission cavity 300 may be about 3.0 mm.

To prevent the radio waves from leaking between the sidewall via holes 240a, a distance d1 between the plurality of sidewall via holes 240a may be about 0.1 times the wavelength of the radio waves to be emitted by the antenna structure 200 or less.

For example, when the radio waves to be emitted through the antenna structure 200 are radio waves of 55 GHz, the distance d1 between the plurality of sidewall via holes 240a may be about 0.55 mm or less.

The front via holes 240b, as shown in FIG. 9, may be provided in part of the front of the emission cavity 300. As described above, since the opening OP is formed in at least one of the front of the emission cavity 300, the front via holes 240b may be provided on both sides of the opening OP.

The front via holes 240b allow the emission cavity 300 to maintain a rectangular shape such that the radio waves may resonate inside the emission cavity 300.

To prevent the radio waves from leaking between the front via holes 240b, a distance d2 between the plurality of front via holes 240b may be about 0.1 times the wavelength of the radio waves to be emitted by the antenna structure 200 or less.

For example, when the radio waves to be emitted through the antenna structure 200 are radio waves of 55 GHz, the distance d2 between the plurality of front via holes 240b may be about 0.55 mm or less.

The rear via holes 240c, as shown in FIG. 9, may be provided in part of the rear of the emission cavity 300.

Since the feeder circuit 201 extends toward the emission cavity 300 from the rear thereof, the rear of the emission cavity 300 is partially open like the front thereof. The width of an open portion of the rear of the emission cavity 300 may vary according to the width of the feeder circuit 201 and may be formed wider than the width of the feeder circuit 201.

The rear via holes 240c allow the emission cavity 300 to maintain the rectangular shape such that the radio waves may resonate inside the emission cavity 300.

To prevent the radio waves from leaking between the rear via holes 240c, a distance d3 between the plurality of rear via holes 240c may be about 0.1 times the wavelength of the radio waves to be emitted by the antenna structure 200 or less.

For example, when the radio waves to be emitted through the antenna structure 200 are radio waves of 55 GHz, the distance d3 between the plurality of rear via holes 240c may be about 0.55 mm or less.

The leak prevention via holes 240d, as shown in FIG. 9, may be provided adjacent to the feeder circuit 201.

As described above, since the feeder circuit 201 extends toward the emission cavity 300 from the rear thereof, the rear of the emission cavity 300 is partially open like the front thereof.

As described above, to prevent the radio waves from leaking through the open portion of the rear of the emission cavity 300, the leak prevention via holes 240d may be provided adjacent to the feeder circuit 201.

Also, to prevent the radio waves from leaking between the leak prevention via holes 240d, a distance d4 between the plurality of leak prevention via holes 240d may be about 0.1 times the wavelength of the radio waves to be emitted by the antenna structure 200 or less.

For example, when the radio waves to be emitted through the antenna structure 200 are radio waves of 55 GHz, the distance d4 between the plurality of leak prevention via holes 240d may be about 0.55 mm or less.

Also, to prevent the radio waves from leaking between the leak prevention via holes 240d and the feeder circuit 201, a distance d5 between the plurality of leak prevention via holes 240d and the feeder circuit 201 may be about 0.1 times the wavelength of the radio waves to be emitted by the antenna structure 200 or less.

For example, when the radio waves to be emitted through the antenna structure 200 are radio waves of 55 GHz, the distance d5 between the plurality of leak prevention via holes 240d and the feeder circuit 201 may be about 0.55 mm or less.

In an edge portion of the feeder circuit 201, an emission hole 210e for emitting signals into the emission cavity 300 is formed.

The emission hole 210e does not penetrate all of the upper conductive plate 210, the lower conductive plate 220, and the dielectric 230 and may be formed from the feeder circuit 201 to a part of the dielectric 230. That is, the a length of the emission hole 210e is smaller than the width of the dielectric 230.

When distance between the emission hole 210e and the leak prevention via hole 240d is small, a signal may be discharged from the emission hole 210e to the leak prevention via hole 240d. In other words, the emission hole 210e may be coupled with the leak prevention via hole 240d.

As described above, to prevent the emission hole 210e and the leak prevention via hole 240d from being coupled with each other, a distance d6 between the emission hole 210e and the leak prevention via hole 240d may be about 0.1 times the wavelength of the radio waves to be emitted by the antenna structure 200 or more.

For example, when the radio waves to be emitted through the antenna structure 200 are radio waves of 55 GHz, the distance d6 between the emission hole 210e and the leak prevention via hole 240d may be about 0.55 mm or more.

As described above, the emission cavity 300 is formed by the upper conductive plate 210, the lower conductive plate 220, and the via holes 240 and may emit radio waves corresponding to a signal with an RF supplied through the feeder circuit 201 into free air space.

In other words, the feeder circuit 201 and the emission cavity 300 may form an antenna.

Next, the antenna formed by the feeder circuit 201 and the emission cavity 300 will be described.

Figure 11:
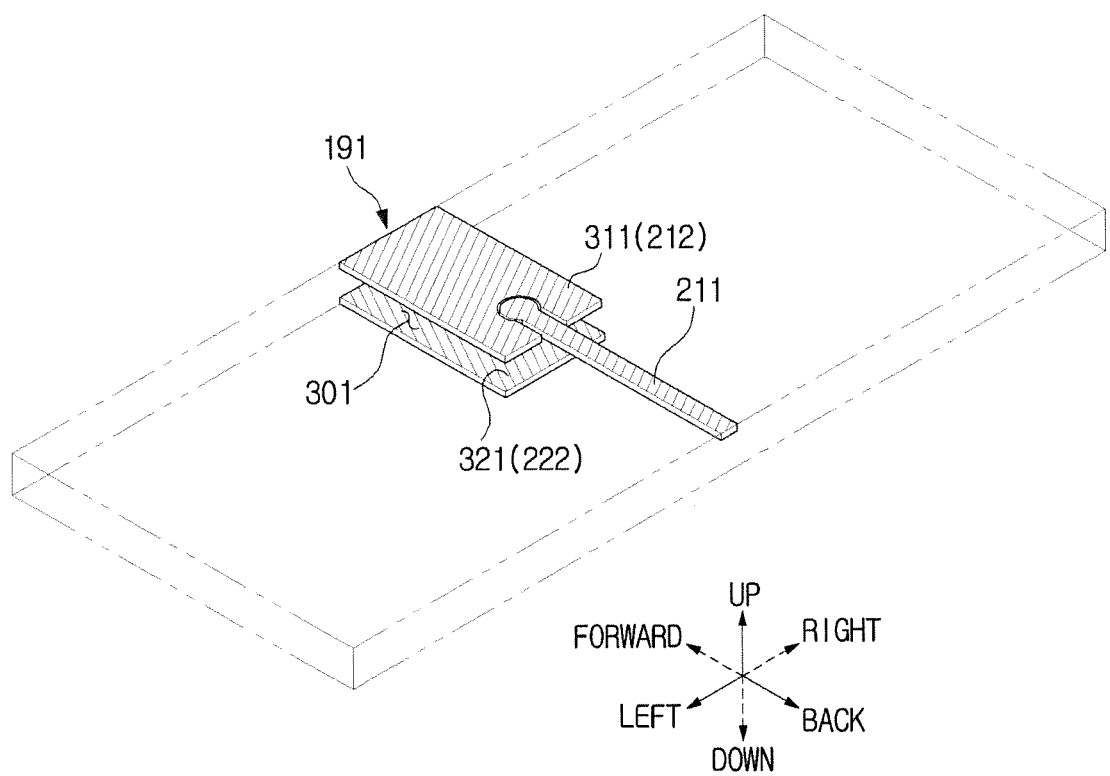
FIG. 11 illustrates a first antenna embodied by the antenna structure in accordance with one embodiment of the present invention.
Figure 12:
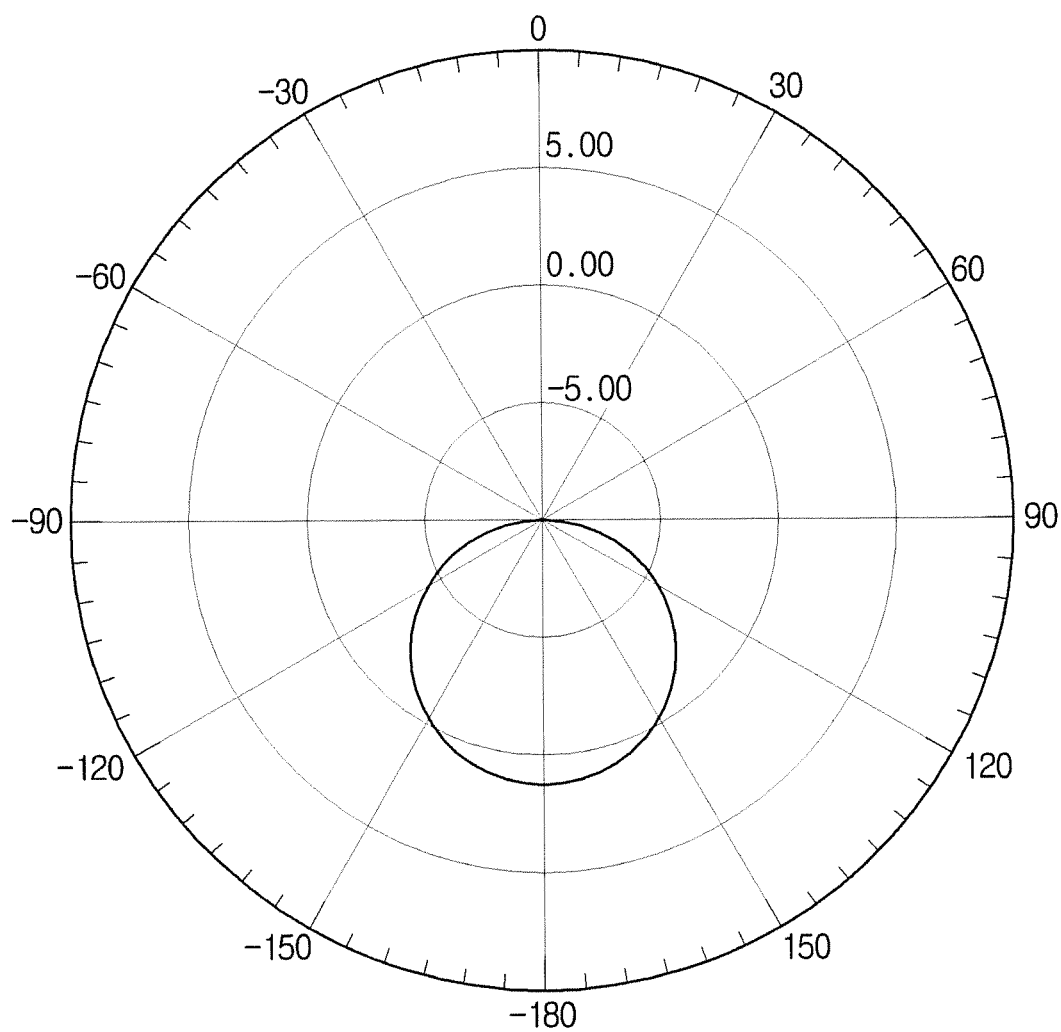
FIG. 12 illustrates radio wave emission properties of the first antenna shown in FIG. 11.
Figure 13:
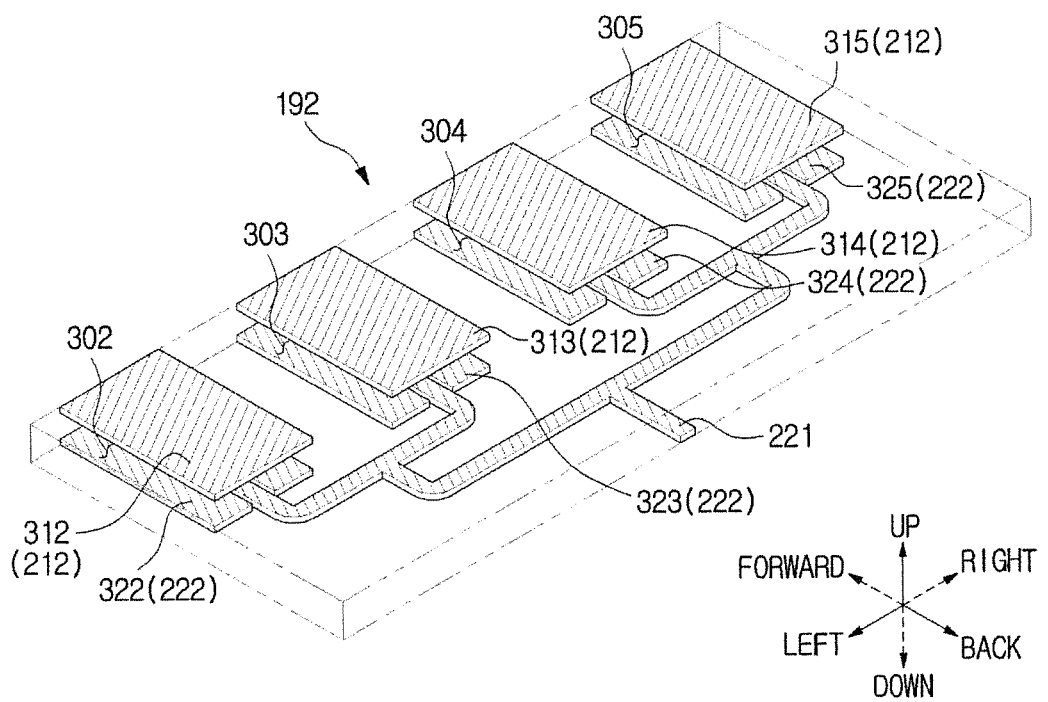
FIG. 13 illustrates a second antenna embodied by the antenna structure in accordance with one embodiment of the present invention.
Figure 14:
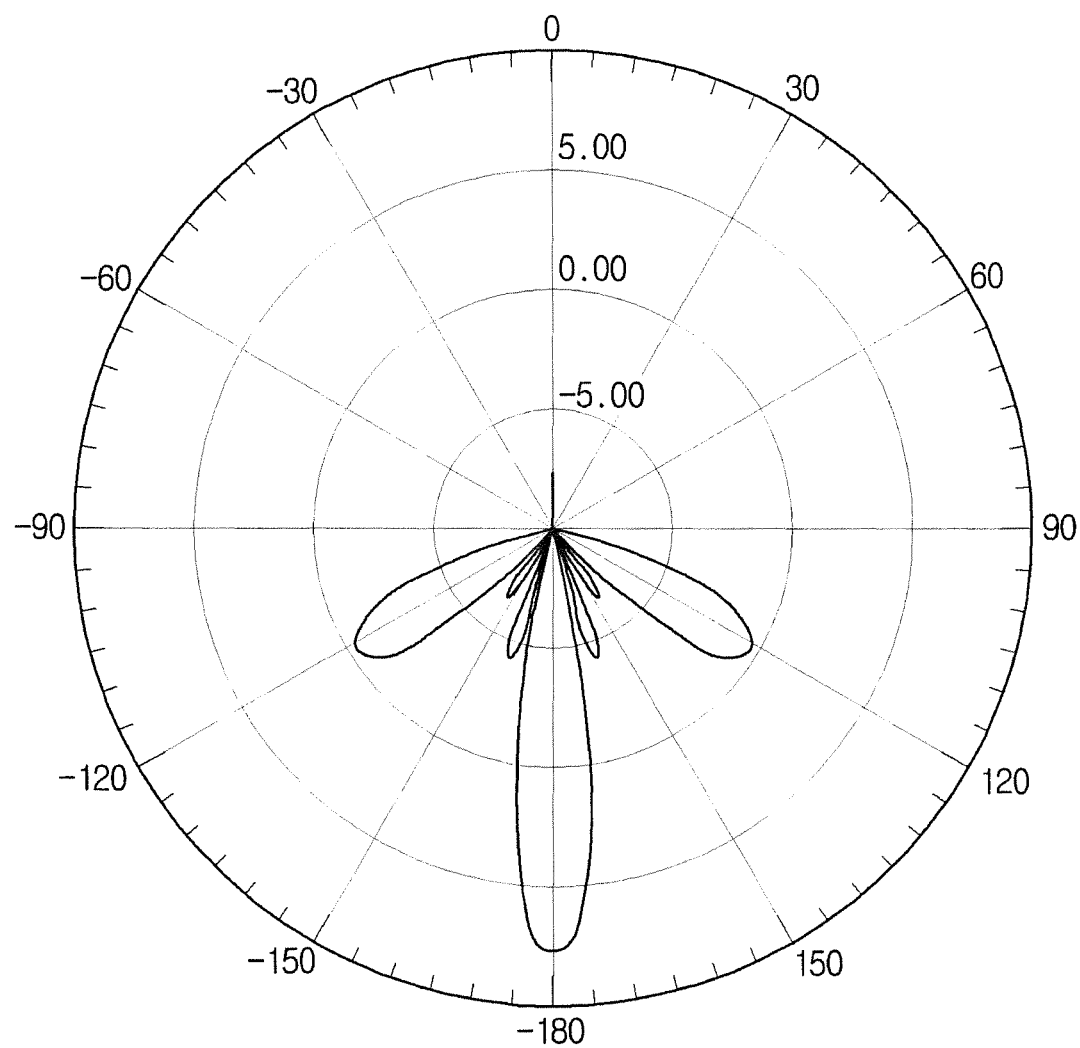
FIG. 14 illustrates radio wave emission properties of the second antenna shown in FIG. 13.

FIG. 11 illustrates the first antenna 191 embodied by the antenna structure 200 in accordance with one embodiment of the present invention. FIG. 12 illustrates radio wave emission properties of the first antenna 191 shown in FIG. 11. FIG. 13 illustrates the second antenna 192 embodied by the antenna structure 200 in accordance with one embodiment of the present invention. FIG. 14 illustrates radio wave emission properties of the second antenna 192 shown in FIG. 13.

As described above, the upper conductive plate 210 (refer to FIG. 6) includes the upper feeder circuit 211 and the upper ground plate 212, and the upper ground plate 212 is partitioned into the first upper ground area 311, the second upper ground area 312, the third upper ground area 313, the fourth upper ground area 314, and the fifth upper ground area 315 by the via holes 240.

The lower conductive plate 220 (refer to FIG. 6) includes the lower feeder circuit 221 and the lower ground plate 222, and the lower ground plate 222 is partitioned into the first lower ground area 321, the second lower ground area 322, the third lower ground area 323, the fourth lower ground area 324, and the fifth lower ground area 325 by the via holes 240.

The emission cavities 300 are formed by the upper conductive plate 210, the lower conductive plate 220, and the via holes 240.

As shown in FIG. 11, a first emission cavity 301 is formed by the first upper ground area 311, the first lower ground area 321, and the via holes 240.

The first feeder circuit 211 and the first emission cavity 301 form the first antenna 191 described above with reference to FIG. 5.

The first feeder circuit 211 may receive an RF transmission signal from the transmitter 182 (refer to FIG. 5) through the duplexer 183 (refer to FIG. 5) and the antenna selection switch 193 (refer to FIG. 5).

The RF transmission signal received through the first feeder circuit 211 is emitted into the first emission cavity 301 and is converted into transmission radio waves in the first emission cavity 301. The transmission radio waves resonate in the first emission cavity 301 and are emitted into free air space through an opening formed in front of the first emission cavity 301.

In other words, the first emission cavity 301 may emit the transmission radio waves corresponding to the RF transmission signal received from the transmitter 182 through the first feeder circuit 211 into free air space.

Also, radio waves in free air space may resonate in the first emission cavity 301. Reception radio waves which resonate in the first emission cavity 301 may be converted into an RF reception signal by the first feeder circuit 211.

The RF reception signal is provided to the antenna selection switch 193 through the first feeder circuit 211 and is provide to the receiver 184 (refer to FIG. 5) through the duplexer 183.

In other words, the first emission cavity 301 may provide the RF reception signal corresponding to the reception radio waves received from free air space to the receiver 184 through the first feeder circuit 211.

As described above, the first antenna 191 is formed of one emission cavity, that is, the first emission cavity 301.

As a result, the first antenna 191 may have a low gain and a beam pattern generated by the first antenna 191 may have a large beamwidth.

For example, as shown in FIG. 12, a maximum gain of the first antenna 191 may be 2 decibels isotropic (dBi) and a half-power beam width (HPBW) of a beam formed by the first antenna 191 may be about 70 degrees or more.

As shown in FIG. 13, a second emission cavity 302 is formed by the second upper ground area 312, the second lower ground area 322, and the via holes 240 and a third emission cavity 303 is formed by the third upper ground area 313, the third lower ground area 323, and the via holes 240. A fourth emission cavity 304 is formed by the fourth upper ground area 314, the fourth lower ground area 324, and the via holes 240 and a fifth emission cavity 305 is formed by the by the fifth upper ground area 315, the fifth lower ground area 325, and the via holes 240.

The second feeder circuit 221 and the second, third, fourth, and fifth emission cavities 302, 303, 304, and 305 form the second antenna described above with reference to FIG. 5.

The second feeder circuit 221 may receive an RF transmission signal from the transmitter 182 through the duplexer 183 and the antenna selection switch 193.

The RF transmission signal received through the second feeder circuit 221 is emitted into the second, third, fourth, and fifth emission cavities 302, 303, 304, and 305, and is converted into transmission radio waves in the second, third, fourth, and fifth emission cavities 302, 303, 304, and 305. The transmission radio waves resonate in the second, third, fourth, and fifth emission cavities 302, 303, 304, and 305, and are emitted into free air space through openings formed in front of the respective second, third, fourth, and fifth emission cavities 302, 303, 304, and 305.

In other words, the second, third, fourth, and fifth emission cavities 302, 303, 304, and 305 may emit the transmission radio waves corresponding to the RF transmission signal received from the transmitter 182 through the first feeder circuit 221 into free air space.

Radio waves in free air space may resonate in the respective second, third, fourth, and fifth emission cavities 302, 303, 304, and 305. Reception radio waves which resonate in the second, third, fourth, and fifth emission cavities 302, 303, 304, and 305 may be converted into an RF reception signal by the second feeder circuit 221.

The RF reception signal is provided to the antenna selection switch 193 through the first feeder circuit 221, and is provided to the receiver 184 through the duplexer 183.

In other words, the second, third, fourth, and fifth emission cavities 302, 303, 304, and 305 may provide the RF reception signal corresponding to the reception radio waves received from free air space to the receiver 184 through the first feeder circuit 221.

As described above, the second antenna 192 consists of four emission cavities, that is, the second, third, fourth, and fifth emission cavities 302, 303, 304, and 305.

As a result, the second antenna 192 may have a high gain and a beam pattern generated by the second antenna 192 may have a small beamwidth.

For example, as shown in FIG. 14, a maximum gain of the second antenna 192 is 8 dBi and the second antenna 192 may communicate within a range that is a maximum of four times that of the first antenna 191.

A beam formed by the second antenna 192 may include a main lobe having an HPBW less than about 10 and a side lobe formed at ±60 degrees with the main lobe.

As shown in FIGS. 11 and 13, the first feeder circuit 211 is provided on a top surface the antenna structure 200 and the second feeder circuit 221 is provided on a bottom surface of the antenna structure 200. Also, in the second feeder circuit 221, one feeder line diverges into four feeder lines and distances from one end of the second feeder circuit 221 to the four other ends are identical. That is, the second feeder circuit 221 corresponds to a parallel circuit.

The first emission cavity 301 of the first antenna 191 is provided between the third emission cavity 303 and the fourth emission cavity 304 of the second antenna 192.

When the first antenna 191 is selected by the antenna selection switch 193 (refer to FIG. 5), radio waves may be emitted into free air space through the first feeder circuit 211 and the first emission cavity 301, and radio waves may be obtained from free air space through the first emission cavity 301 and the first feeder circuit 211.

When the second antenna 192 is selected by the antenna selection switch 193, radio waves may be emitted into free air space through the second feeder circuit 221 and the second, third, fourth, and fifth emission cavities 302, 303, 304, and 305, and radio waves may be obtained from free air space through the second feeder circuit 221 and the second, third, fourth, and fifth emission cavities 302, 303, 304, and 305.

In other words, the first feeder circuit 211 and the first emission cavity 301 may be activated or the second feeder circuit 221 and the second, third, fourth, and fifth emission cavities 302, 303, 304, and 305 may be activated.

Figure 15:
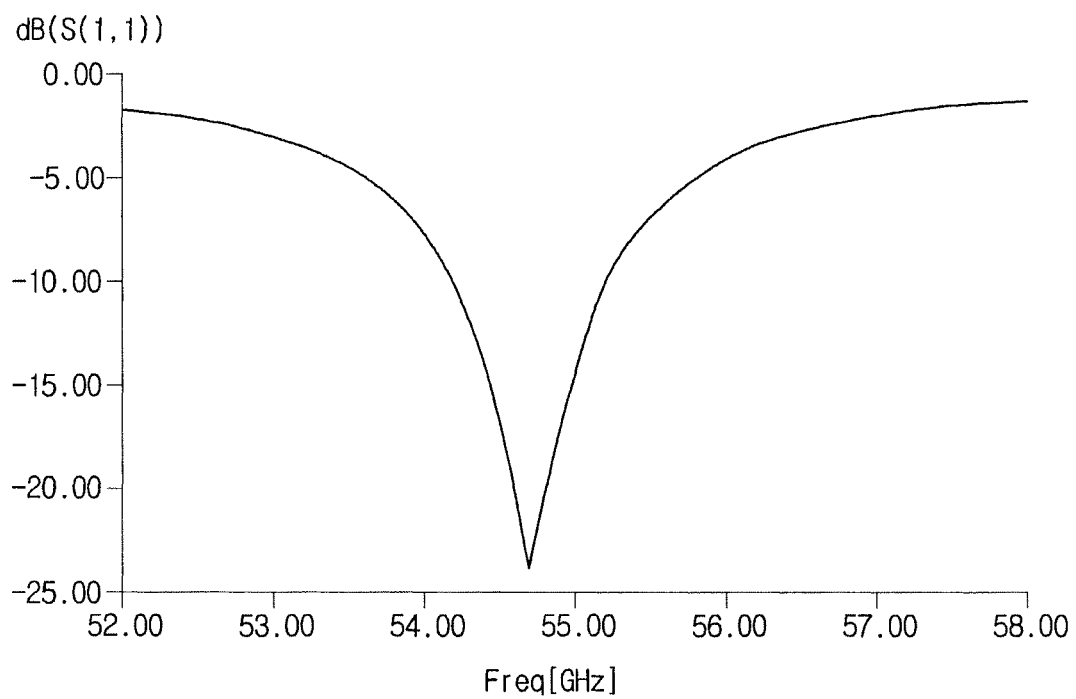
FIG. 15 illustrates a reflection coefficient of the antenna structure in accordance with one embodiment of the present invention.

FIG. 15 illustrates a reflection coefficient of the antenna structure 200 in accordance with one embodiment of the present invention.

According to an experiment, as shown in FIG. 15, the antenna structure 200 for transmitting radio waves of 55 GHz has a bandwidth of about 1 GHz based on −10 dB in which power of a reflected electromagnetic wave is about 10%.

The first antenna 191 and the second antenna 192 have the same reflection coefficients.

The antenna module 190 and the antenna structure 200 have been described above.

Next, an operation of the antenna module 190 will be described.

Figure 16:
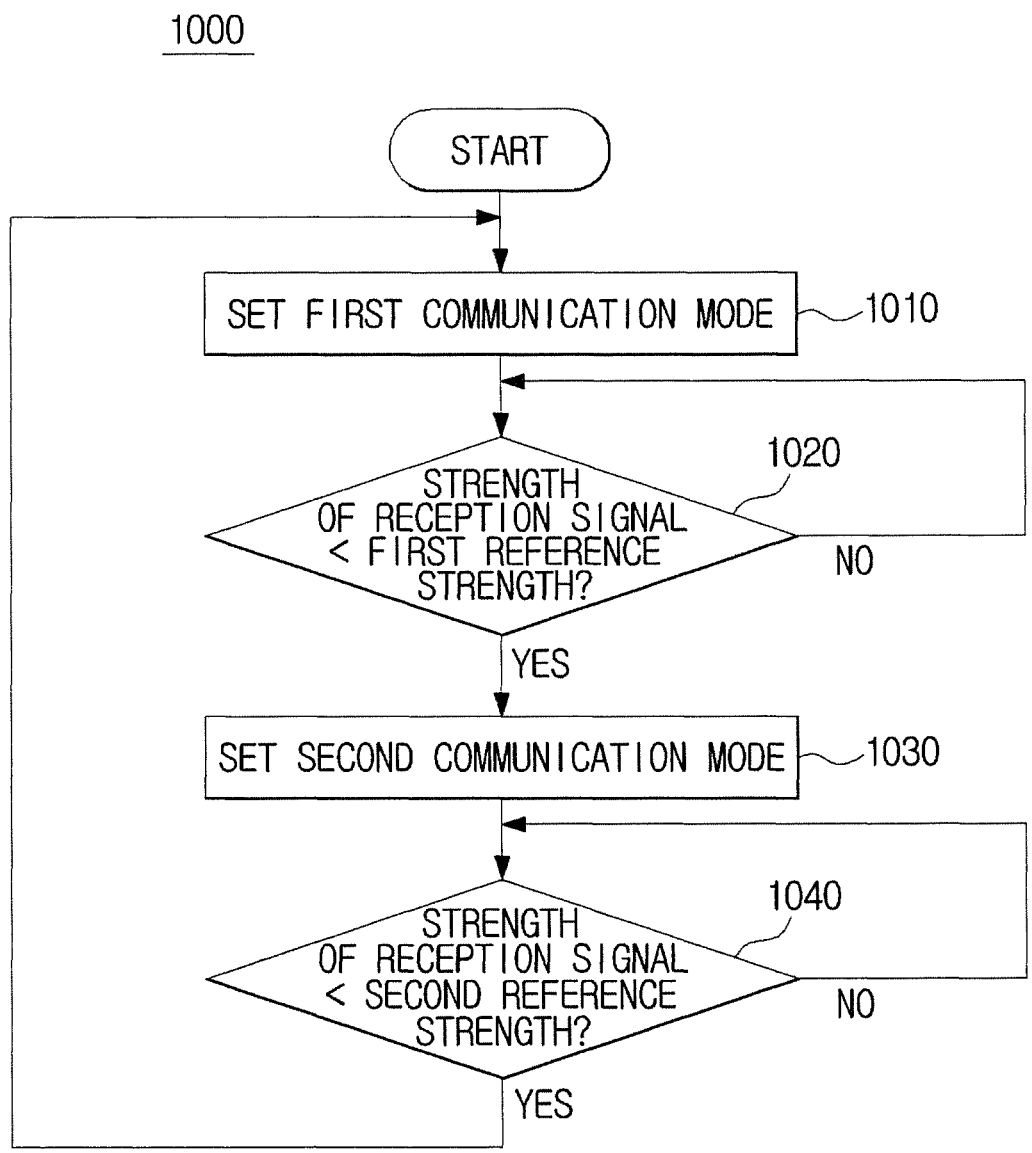
FIG. 16 illustrates one example of an operation of an antenna module included in the vehicle in accordance with one embodiment of the present invention.
Figure 17:
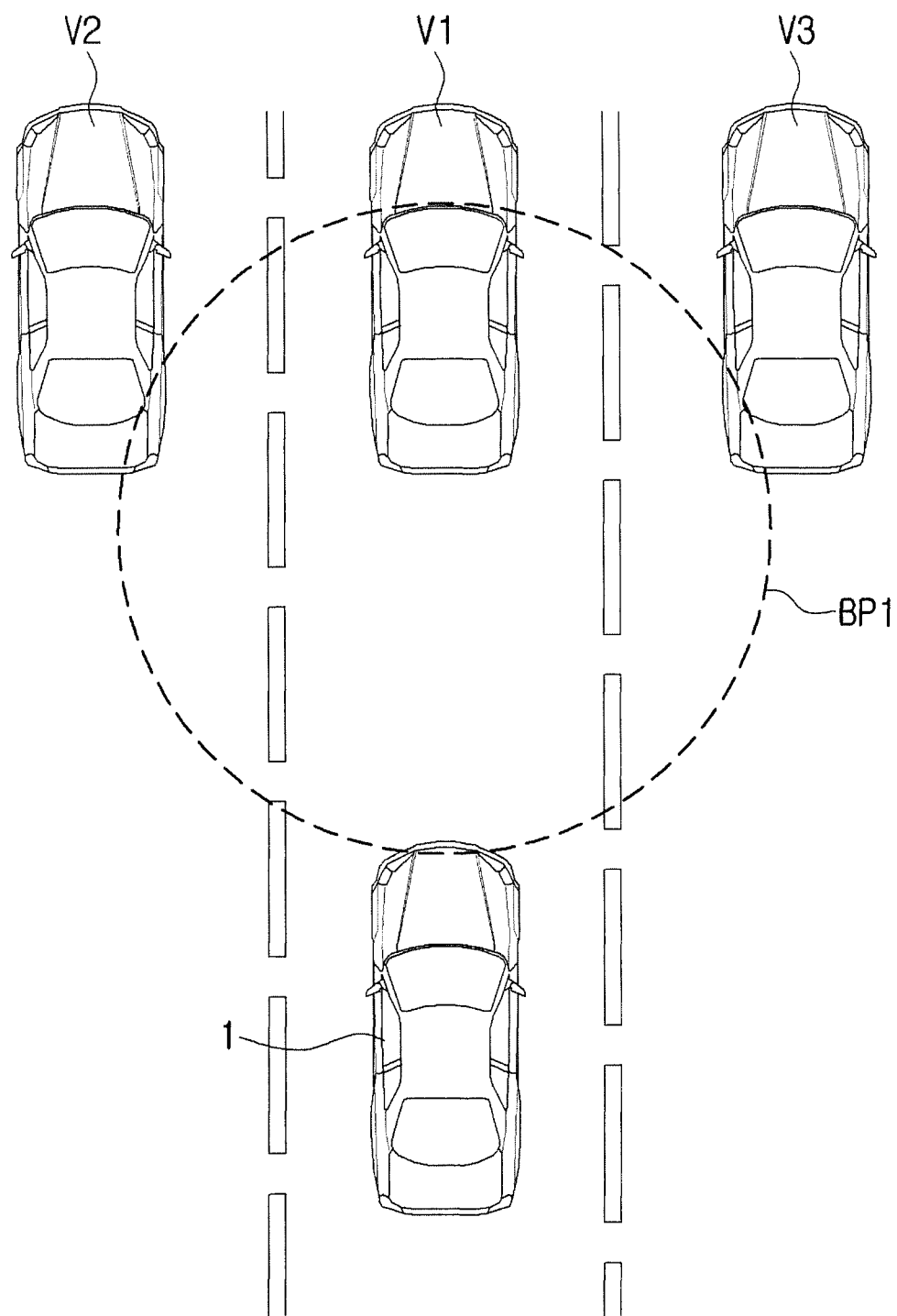
FIGS. 17 to 19 illustrate beam patterns generated by the operation of the antenna module shown in FIG. 16.
Figure 18:
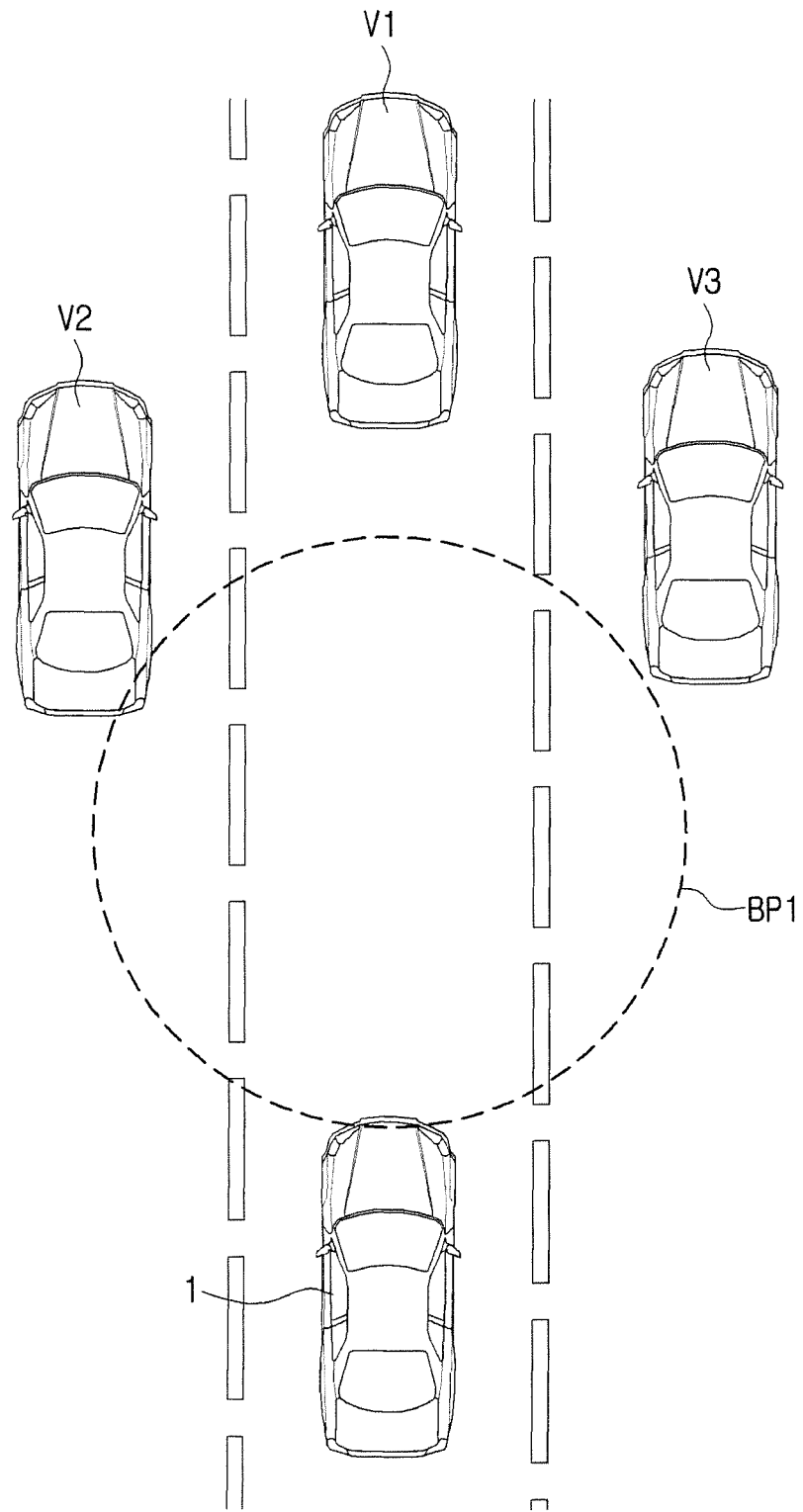
Figure 19:
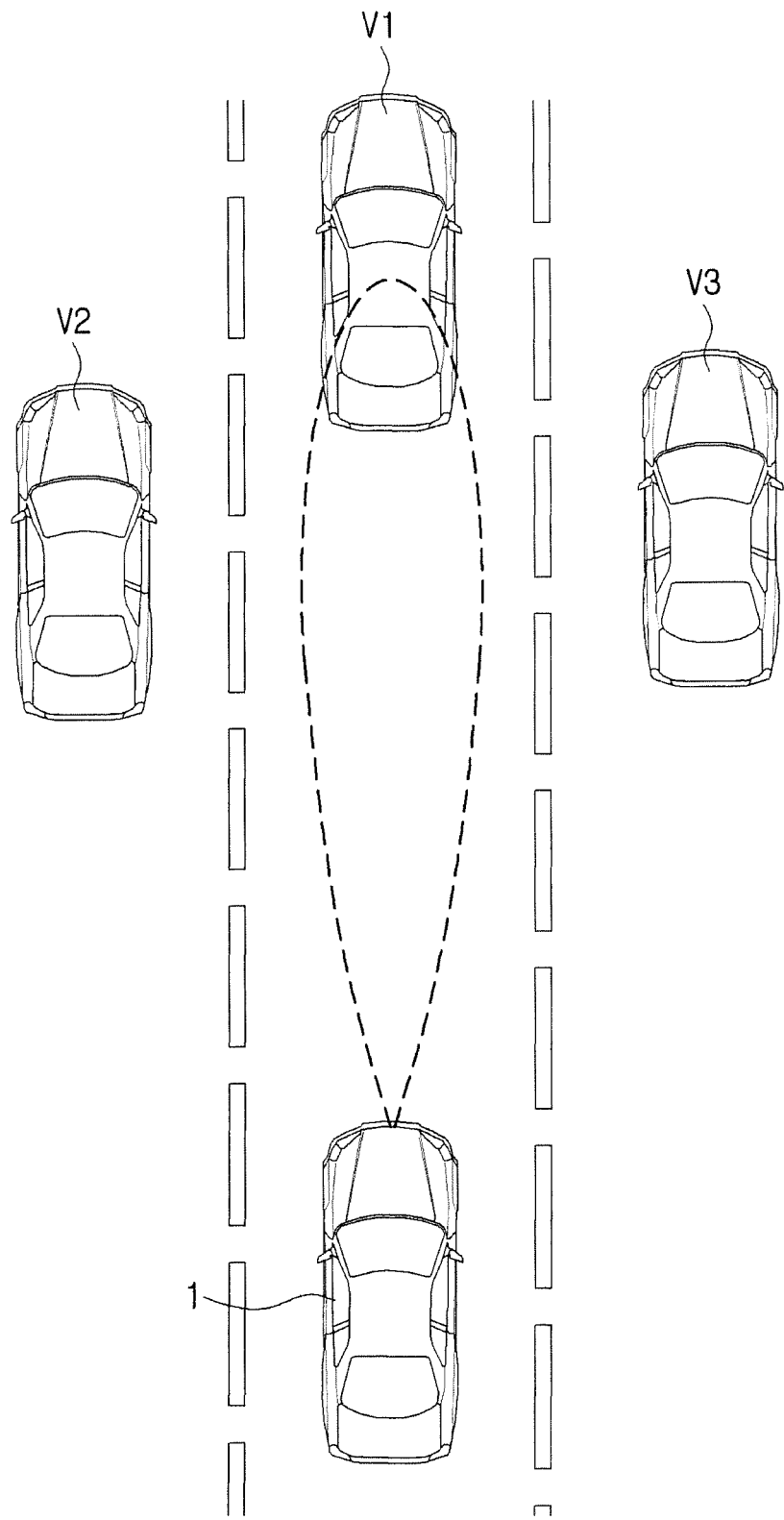

FIG. 16 illustrates an example of an operation 1000 of the antenna module 190 included in the vehicle 1 in accordance with one embodiment of the present invention. FIGS. 17 to 19 illustrate beam patterns generated by the operation 1000 of the antenna module 190 shown in FIG. 16.

The operation 1000 of the antenna module 190 will be described referring to FIGS. 16 to 19.

The antenna module 190 is set to be in a first communication mode (S1010).

In the first communication mode, the antenna module 190 activates the first antenna 191.

The antenna selection controller 194 of the antenna module 190 may provide a first antenna selection signal for selecting the first antenna 191 to the antenna selection switch 193. The antenna selection switch 193 which receives the first antenna selection signal may activate the first antenna 191 and may deactivate the second antenna 192.

As a result, as shown in FIG. 17, a first beam pattern BP1 in which a maximum gain is small and an HPBW is large is formed by the first antenna 191.

Also, the vehicle 1 may communicate not only with a first vehicle V1 located in front of the vehicle 1 but also with a second vehicle V2 and a third vehicle V3 located on left and right sides of the vehicle 1.

In the first communication mode, the antenna module 190 determines whether the strength of a reception signal received through the first antenna 191 is below a first reference strength (S1020).

During the first communication mode, the vehicle 1 may communicate with other vehicles through the first antenna 191 of the antenna module 190. For example, the vehicle 1 may communicate with the first vehicle V1 shown in FIG. 17.

During communication with other vehicles, the antenna selection controller 194 of the antenna module 190 may measure the strength of the reception signal received through the first antenna 191 at predetermined intervals.

After measuring the strength of the reception signal, the antenna selection controller 194 may compare the measured strength of the reception signal with the predetermined first reference strength.

When the strength of the reception signal is not below the first reference strength ("No" in S1020), the antenna module 190 remains in the first communication mode.

When the strength of the reception signal is not below the first reference strength, the antenna module 190 may determine that the first vehicle V1 is located within the first beam pattern BP1 generated by the first antenna 191.

Accordingly, the antenna module 190 may remain in the first communication mode.

The antenna module 190 repetitively determines whether the strength of the reception signal is below the first reference strength. The antenna selection controller 194 of the antenna module 190 may measure the strength of the reception signal received through the first antenna 191 at predetermined intervals, and may compare the measured strength of the reception signal with the predetermined first reference strength.

When the strength of the reception signal is below the first reference strength ("Yes" in S1020), the antenna module 190 is set to be in a second communication mode (S1030).

When the strength of the reception signal is below the first reference strength, the antenna module 190 may determine that the first vehicle V1 has left the first beam pattern BP1 generated by the first antenna 191.

For example, as shown in FIG. 18, when the distance between the vehicle 1 and the first vehicle V1 increases, the first vehicle V1 leaves the first beam pattern BP1 generated by the first antenna 191 and the strength of the reception signal falls below the first reference strength.

Accordingly, the antenna module 190 may change the communication mode to the second communication mode.

In the second communication mode, the antenna module 190 activates the second antenna 192.

The antenna selection controller 194 of the antenna module 190 may provide a second antenna selection signal for selecting the second antenna 192 to the antenna selection switch 193. The antenna selection switch 193 which receives the second antenna selection signal may activate the second antenna 192 and may deactivate the first antenna 191.

As a result, as shown in FIG. 19, a second beam pattern BP2 in which a maximum gain is large and an HPBW is small is formed by the second antenna 192.

In the second communication mode, the antenna module 190 determines whether the strength of a reception signal received through the second antenna 192 is below a second reference strength (S1040).

During the second communication mode, the vehicle 1 may communicate with other vehicles through the second antenna 192 of the antenna module 190. For example, the vehicle 1 may communicate with the first vehicle V1 shown in FIG. 19.

During communication with other vehicles, the antenna selection controller 194 of the antenna module 190 may measure the strength of the reception signal received through the second antenna 192 at predetermined intervals.

After measuring the strength of the reception signal, the antenna selection controller 194 may compare the measured strength of the reception signal with the predetermined second reference strength, and may determine whether the measured strength of the reception signal is below the second reference strength.

When the strength of the reception signal is not below the second reference strength ("No" in S1040), the antenna module 190 remains in the second communication mode.

When the strength of the reception signal is not below the second reference strength, the antenna module 190 may determine that the first vehicle V1 is located within the second beam pattern BP2 generated by the second antenna 192.

Accordingly, the antenna module 190 may remain in the second communication mode.

The antenna module 190 repetitively determines whether the strength of the reception signal is below the second reference strength. The antenna selection controller 194 of the antenna module 190 may measure the strength of the reception signal received through the second antenna 192 at predetermined intervals, and may compare the measured strength of the reception signal with the predetermined second reference strength.

When the strength of the reception signal is below the second reference strength ("Yes" in S1040), the antenna module 190 is set to be in the first communication mode (S1010).

When the strength of the reception signal is below the second reference strength, the antenna module 190 may determine that the first vehicle V1 has left the second beam pattern BP2 generated by the second antenna 192.

Accordingly, the antenna module 190 may change the communication mode to the first communication mode.

As described above, the antenna module 190 may be set to be in the first communication mode or the second communication mode depending on the strength of the reception signal received through the first antenna 191 or the second antenna 192.

However, the communication mode of the antenna module 190 is not limited to being determined depending on the strength of the reception signal.

Figure 20:
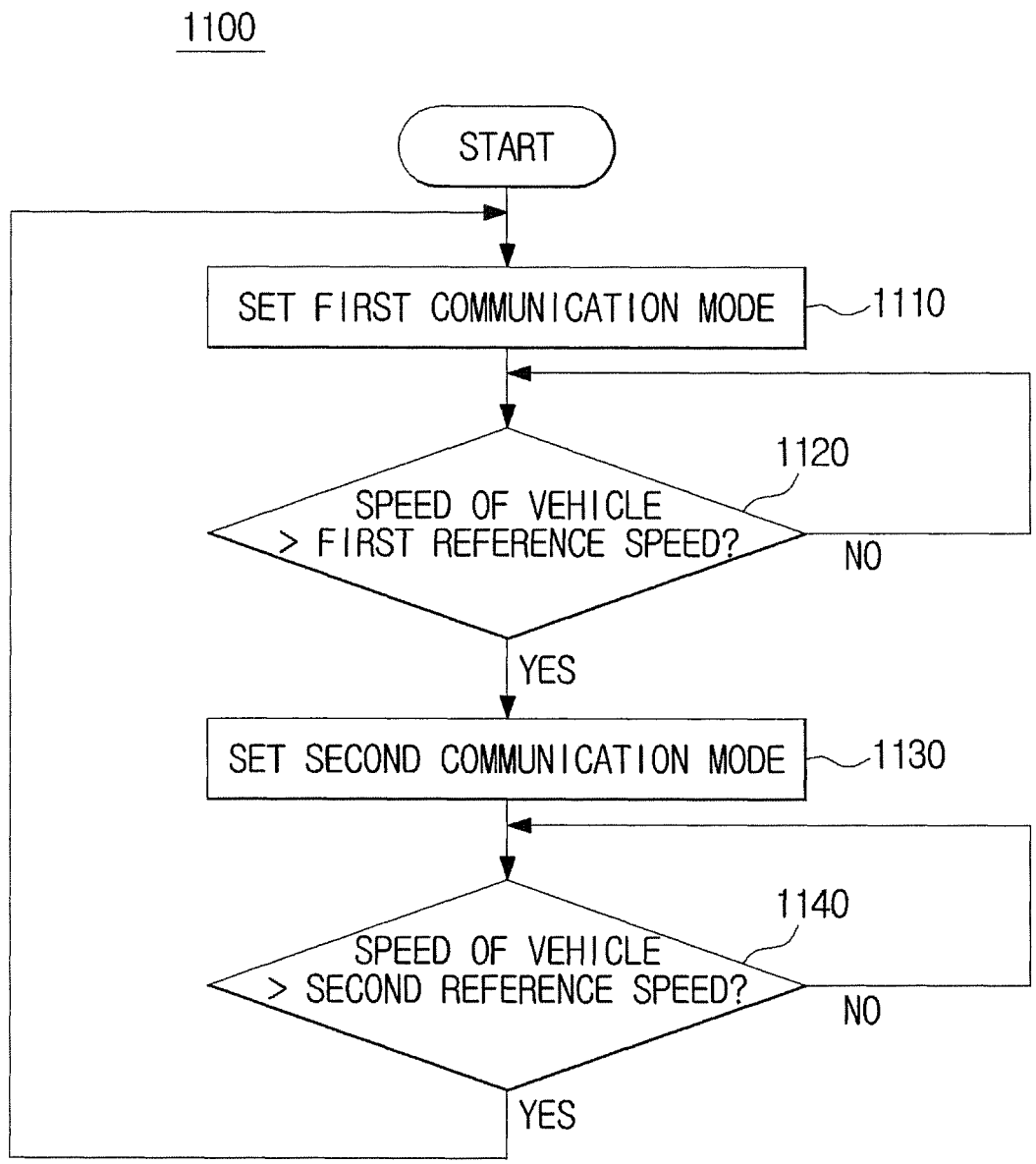
FIG. 20 illustrates another example of the operation of the antenna module included in the vehicle in accordance with one embodiment of the present invention.

FIG. 20 illustrates another example of the operation of the antenna module 190 included in the vehicle 1 in accordance with one embodiment of the present invention.

Referring to FIG. 20, an operation 1100 of the antenna module 190 will be described.

The antenna module 190 is set to be in a first communication mode (S1110).

In the first communication mode, the antenna module 190 activates the first antenna 191.

The antenna selection controller 194 of the antenna module 190 may provide a first antenna selection signal for selecting the first antenna 191 to the antenna selection switch 193. The antenna selection switch 193 which receives the first antenna selection signal may activate the first antenna 191 and may deactivate the second antenna 192.

As a result, a first beam pattern in which a maximum gain is small and an HPBW is large is formed by the first antenna 191.

During the first communication mode, the antenna module 190 determines whether the speed of the vehicle 1 is higher than a first reference speed (S1120).

When the speed of a vehicle increases, the distance between vehicles generally increases.

Using this, the antenna module 190 may receive information related to the speed of the vehicle 1 from a wheel speed sensor installed in the vehicle 1 through a communication network inside the vehicle 1, and may compare the speed of the vehicle 1 with the first reference speed.

When the speed of the vehicle 1 is not higher than the first reference speed ("No" in S1120), the antenna module 190 remains in the first communication mode.

When the speed of the vehicle 1 is not higher than the first reference speed, the antenna module 190 may determine that the distance between a communication target vehicle and the vehicle 1 is short. In other words, the antenna module 190 may determine that the first vehicle V1 is located within the first beam pattern BP1 generated by the first antenna 191.

Accordingly, the antenna module 190 may remain in the first communication mode.

The antenna module 190 repetitively determines whether the speed of the vehicle 1 is higher than the first reference speed.

When the speed of the vehicle 1 is higher than the first reference speed ("Yes" in S1120), the antenna module 190 is set to be in a second communication mode (S1130).

When the speed of the vehicle 1 is higher than the first reference speed, the antenna module 190 may determine that the distance between the communication target vehicle and the vehicle 1 is long. In other words, the antenna module 190 may determine that the first vehicle V1 has left the first beam pattern BP1 generated by the first antenna 191.

Accordingly, the antenna module 190 may change the communication mode to the second communication mode.

In the second communication mode, the antenna module 190 activates the second antenna 192.

The antenna selection controller 194 of the antenna module 190 may provide a second antenna selection signal for selecting the second antenna 192 to the antenna selection switch 193. The antenna selection switch 193 which receives the second antenna selection signal may activate the second antenna 192 and may deactivate the first antenna 191.

As a result, a second beam pattern in which a maximum gain is large and an HPBW is small is formed by the second antenna 192.

During the second communication mode, the antenna module 190 determines whether the speed of the vehicle 1 is lower than a second reference speed (S1140).

During the second communication mode, the vehicle 1 may communicate with other vehicles through the second antenna 192 of the antenna module 190.

During communication with other vehicles, the antenna selection controller 194 of the antenna module 190 may receive information related to the speed of the vehicle 1 from the wheel speed sensor installed in the vehicle 1 through the communication network inside the vehicle 1, and may compare the speed of the vehicle 1 with the second reference speed.

The second reference speed may be identical to or lower than the first reference speed described above. When the second reference speed is lower than the first reference speed, the communication mode of the antenna module 190 is prevented from being repetitively changed due to changes in the speed of the vehicle 1.

When the speed of the vehicle 1 is not lower than the second reference speed ("No" in S1140), the antenna module 190 remains in the second communication mode.

When the speed of the vehicle 1 is not lower than the second reference speed, the antenna module 190 may determine that the distance between the communication target vehicle and the vehicle 1 is long.

Accordingly, the antenna module 190 may remain in the second communication mode.

The antenna module 190 repetitively determines whether the speed of the vehicle 1 is higher than the first reference speed.

When the speed of the vehicle 1 is lower than the second reference speed ("Yes" in S1140), the antenna module 190 is set to be in the first communication mode (S1110).

When the speed of the vehicle 1 is lower than the second reference speed, the antenna module 190 may determine that the distance between the communication target vehicle and the vehicle 1 is short.

Accordingly, the antenna module 190 may change to the first communication mode.

As described above, the antenna module 190 may be set to be in the first communication mode or the second communication mode depending on the speed of the vehicle 1.

As is apparent from the above description, an antenna in accordance with one embodiment of the present invention generates two or more different beam patterns.

An antenna module in accordance with one embodiment of the present invention generates different beam patterns according to a distance from a communication target.

A vehicle in accordance with one embodiment of the present invention communicates with a communication target vehicle using different beam patterns according to a distance from the communication target vehicle.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An antenna comprising:
    first and second conductive plates disposed to face each other;
    a dielectric disposed between the first and second conductive plates; and
    a plurality of via holes which penetrate the first and second conductive plates and the dielectric,
    wherein a first emission cavity and a plurality of second emission cavities which emit radio waves are formed by the plurality of via holes and the first and second conductive plates,
    wherein the first conductive plate comprises a first feeder circuit which transmits an RF signal to the first emission cavity and a first ground plate which forms the first emission cavity and the plurality of second emission cavities, the first feeder circuit being coplanar with the first ground plate,
    wherein the second conductive plate comprises a second feeder circuit which transmits an RF signal to the plurality of second emission cavities and a second ground plate which forms the first emission cavity and the plurality of emission cavities, the second feeder circuit being coplanar with the second ground plate,
    wherein the radio waves emitted by the first emission cavity form a first beam pattern, and
    wherein the radio waves emitted by the plurality of second emission cavities form a second beam pattern.

2. The antenna of claim 1, wherein the plurality of via holes comprise:
    a plurality of sidewall via holes arranged in a direction in which the radio waves are emitted; and
    a plurality of leak prevention via holes adjacent to the first and second feeder circuits to prevent leaking of the radio waves.

3. The antenna of claim 2, wherein distances between the plurality of via holes are shorter than 0.1 times a wavelength of the radio waves emitted through one of the first emission cavity and the plurality of emission cavities.

4. The antenna of claim 2, wherein the first emission cavity shares the sidewall via holes with at least two of the plurality of second emission cavities.

5. The antenna of claim 1, wherein the first feeder circuit comprises:
- a first feeder line which transmits the RF signal to the first emission cavity; and
- a first emission hole which emits radio waves corresponding to the RF signal to the first emission cavity.

6. The antenna of claim 1, wherein the second feeder circuit comprises:
- a second feeder line which transmits the RF signal to the plurality of second emission cavities; and
- a plurality of second emission holes which emit radio waves corresponding to the RF signal to the second emission cavities.

7. The antenna of claim 6, wherein, in the second feeder circuit, distances from one end of the second feeder line to the plurality of second emission holes are identical.

8. The antenna of claim 1, wherein, when the RF signal is supplied through the first feeder circuit, the first emission cavity emits radio waves corresponding to the RF signal, and
   wherein, when the RF signal is supplied through the second feeder circuit, the plurality of second emission cavities emit radio waves corresponding to the RF signal.

* * * * *